(12) United States Patent
Alizadeh-Shabdiz et al.

(10) Patent No.: US 8,890,746 B2
(45) Date of Patent: Nov. 18, 2014

(54) METHOD OF AND SYSTEM FOR INCREASING THE RELIABILITY AND ACCURACY OF LOCATION ESTIMATION IN A HYBRID POSITIONING SYSTEM

(75) Inventors: Farshid Alizadeh-Shabdiz, Wayland, MA (US); Mohammad A. Heidari, Worcester, MA (US)

(73) Assignee: Skyhook Wireless, Inc., Boston, MA (US)

( * ) Notice: Subject to any disclaimer, the term of this patent is extended or adjusted under 35 U.S.C. 154(b) by 244 days.

(21) Appl. No.: 13/288,292

(22) Filed: Nov. 3, 2011

(65) Prior Publication Data

US 2012/0112958 A1    May 10, 2012

Related U.S. Application Data

(60) Provisional application No. 61/409,643, filed on Nov. 3, 2010.

(51) Int. Cl.
*G01S 19/40* (2010.01)
*G01S 19/48* (2010.01)
*G01S 5/02* (2010.01)

(52) U.S. Cl.
CPC .............. *G01S 19/48* (2013.01); *G01S 5/0263* (2013.01)
USPC ................................ 342/357.23; 342/357.31

(58) Field of Classification Search
CPC .......... G01S 19/40; G01S 19/42; G01S 19/48
USPC ............... 342/357.23, 357.25, 357.31, 357.4; 701/468, 469
See application file for complete search history.

(56) References Cited

U.S. PATENT DOCUMENTS

| | | | |
|---|---|---|---|
| 3,881,060 A | 4/1975 | Connell et al. |
| 4,310,726 A | 1/1982 | Asmuth |
| 4,415,771 A | 11/1983 | Martinez |
| 4,757,267 A | 7/1988 | Riskin |
| 4,876,550 A | 10/1989 | Kelly |
| 4,924,491 A | 5/1990 | Compton et al. |
| 5,043,736 A | 8/1991 | Darnell et al. |
| 5,095,505 A | 3/1992 | Finucane et al. |
| 5,119,504 A | 6/1992 | Durboraw, III |
| 5,136,636 A | 8/1992 | Wegrzynowicz |
| 5,161,180 A | 11/1992 | Chavous |
| 5,235,630 A | 8/1993 | Moody et al. |

(Continued)

FOREIGN PATENT DOCUMENTS

| CA | 2056203 A1 | 7/1992 |
|---|---|---|
| EP | 0493896 A2 | 7/1992 |

(Continued)

OTHER PUBLICATIONS

"A Practical Approach to Identifying and Tracking Unauthorized 802.11 Cards and Access Points," Interlink Networks, 2002, 20 pages.

(Continued)

*Primary Examiner* — Dao Phan
(74) *Attorney, Agent, or Firm* — Cesari and McKenna, LLP

(57) ABSTRACT

Methods and systems of hybrid positioning are provided for increasing the reliability and accuracy of location estimation. According to embodiments of the invention, the quality of reported locations from specific sources of location is assessed. Satellite and non-satellite positioning systems provide initial positioning estimates. For each positioning system relevant information is collected and based on the collected information each system is assigned appropriate weight.

41 Claims, 5 Drawing Sheets

(56) References Cited

U.S. PATENT DOCUMENTS

| | | | |
|---|---|---|---|
| 5,235,633 | A | 8/1993 | Dennison et al. |
| 5,315,636 | A | 5/1994 | Patel |
| 5,334,974 | A | 8/1994 | Simms et al. |
| 5,353,023 | A | 10/1994 | Mitsugi |
| 5,379,337 | A | 1/1995 | Castillo et al. |
| 5,389,935 | A | 2/1995 | Drouault et al. |
| 5,414,432 | A | 5/1995 | Penny, Jr. et al. |
| 5,420,592 | A | 5/1995 | Johnson |
| 5,564,121 | A | 10/1996 | Chow et al. |
| 5,936,572 | A | 8/1999 | Loomis et al. |
| 5,940,825 | A | 8/1999 | Castelli et al. |
| 5,943,606 | A | 8/1999 | Kremm et al. |
| 5,999,124 | A | 12/1999 | Sheynblat |
| 6,134,448 | A | 10/2000 | Shoji et al. |
| 6,185,427 | B1 | 2/2001 | Krasner et al. |
| 6,192,312 | B1 | 2/2001 | Hummelsheim |
| 6,262,741 | B1 | 7/2001 | Davies |
| 6,272,405 | B1 | 8/2001 | Kubota et al. |
| 6,420,999 | B1 | 7/2002 | Vayanos |
| 6,484,034 | B1 | 11/2002 | Tsunehara et al. |
| 6,574,557 | B2 | 6/2003 | Endo |
| 6,587,692 | B1 | 7/2003 | Chen et al. |
| 6,625,647 | B1 | 9/2003 | Barrick, Jr. et al. |
| 6,664,925 | B1 | 12/2003 | Moore et al. |
| 6,665,658 | B1 | 12/2003 | DaCosta et al. |
| 6,674,403 | B2 | 1/2004 | Gray et al. |
| 6,678,611 | B2 | 1/2004 | Khavakh et al. |
| 6,707,422 | B2 | 3/2004 | Sheynblat et al. |
| 6,725,158 | B1 | 4/2004 | Sullivan et al. |
| 6,741,188 | B1 | 5/2004 | Miller et al. |
| 6,754,488 | B1 | 6/2004 | Won et al. |
| 6,771,211 | B2 | 8/2004 | Syrjarinne et al. |
| 6,799,049 | B1 | 9/2004 | Zellner et al. |
| 6,862,524 | B1 | 3/2005 | Nagda et al. |
| 6,888,811 | B2 | 5/2005 | Eaton et al. |
| 6,894,645 | B1 | 5/2005 | Akopian et al. |
| 6,928,292 | B2 | 8/2005 | Tsunehara et al. |
| 6,975,266 | B2 | 12/2005 | Abraham et al. |
| 6,978,023 | B2 | 12/2005 | Dacosta |
| 6,990,351 | B2 | 1/2006 | Tsunehara et al. |
| 6,990,428 | B1 | 1/2006 | Kaiser et al. |
| 7,086,089 | B2 | 8/2006 | Hrastar et al. |
| 7,116,988 | B2 | 10/2006 | Dietrich et al. |
| 7,120,449 | B1 | 10/2006 | Muhonen et al. |
| 7,123,928 | B2 | 10/2006 | Moeglein et al. |
| 7,130,642 | B2 | 10/2006 | Lin |
| 7,130,646 | B2 | 10/2006 | Wang |
| 7,151,939 | B2 | 12/2006 | Sheynblat |
| 7,155,239 | B2 | 12/2006 | Zeng et al. |
| 7,167,715 | B2 | 1/2007 | Stanforth |
| 7,167,716 | B2 | 1/2007 | Kim et al. |
| 7,221,928 | B2 | 5/2007 | Laird et al. |
| 7,236,126 | B2 | 6/2007 | Jeon et al. |
| 7,242,950 | B2 | 7/2007 | Suryanarayana et al. |
| 7,250,907 | B2 | 7/2007 | Krumm et al. |
| 7,254,405 | B2 | 8/2007 | Lin et al. |
| 7,257,411 | B2 | 8/2007 | Gwon et al. |
| 7,277,404 | B2 | 10/2007 | Tanzella et al. |
| 7,299,058 | B2 | 11/2007 | Ogino |
| 7,305,245 | B2 | 12/2007 | Alizadeh-Shabdiz et al. |
| 7,313,402 | B1 | 12/2007 | Rahman |
| 7,319,878 | B2 | 1/2008 | Sheynblat et al. |
| 7,373,154 | B2 | 5/2008 | Sharony et al. |
| 7,389,114 | B2 | 6/2008 | Ju et al. |
| 7,397,424 | B2 | 7/2008 | Houri |
| 7,403,762 | B2 | 7/2008 | Morgan et al. |
| 7,412,246 | B2 | 8/2008 | Lewis et al. |
| 7,414,988 | B2 | 8/2008 | Jones et al. |
| 7,426,197 | B2 | 9/2008 | Schotten et al. |
| 7,433,694 | B2 | 10/2008 | Morgan et al. |
| 7,433,696 | B2 | 10/2008 | Dietrich et al. |
| 7,440,755 | B2 | 10/2008 | Balachandran et al. |
| 7,471,954 | B2 | 12/2008 | Brachet et al. |
| 7,474,897 | B2 | 1/2009 | Morgan et al. |
| 7,479,922 | B2 | 1/2009 | Hunt et al. |
| 7,493,127 | B2 | 2/2009 | Morgan et al. |
| 7,502,620 | B2 | 3/2009 | Morgan et al. |
| 7,515,578 | B2 | 4/2009 | Alizadeh-Shabdiz et al. |
| 7,519,372 | B2 | 4/2009 | MacDonald et al. |
| 7,522,908 | B2 | 4/2009 | Hrastar |
| 7,525,484 | B2 | 4/2009 | Dupray et al. |
| 7,545,894 | B2 | 6/2009 | Ziedan et al. |
| 7,551,579 | B2 | 6/2009 | Alizadeh-Shabdiz et al. |
| 7,551,929 | B2 | 6/2009 | Alizadeh-Shabdiz et al. |
| 7,587,081 | B2 | 9/2009 | Rovira-Mas et al. |
| 7,595,754 | B2 | 9/2009 | Mehta |
| 7,660,588 | B2 | 2/2010 | Sheynblat et al. |
| 7,664,511 | B2 | 2/2010 | Wang et al. |
| 7,672,675 | B2 | 3/2010 | Pande et al. |
| 7,683,835 | B2 | 3/2010 | Sharma |
| 7,724,612 | B2 | 5/2010 | Azim |
| 7,764,231 | B1 | 7/2010 | Karr et al. |
| 7,768,963 | B2 | 8/2010 | Alizadeh-Shabdiz |
| 7,769,396 | B2 | 8/2010 | Alizadeh-Shabdiz et al. |
| 7,818,017 | B2 | 10/2010 | Alizadeh-Shabdiz et al. |
| 7,822,427 | B1 | 10/2010 | Hou |
| 7,835,754 | B2 | 11/2010 | Alizadeh-Shabdiz et al. |
| 7,848,733 | B2 | 12/2010 | Bull et al. |
| 7,853,250 | B2 | 12/2010 | Harvey et al. |
| 7,856,209 | B1 | 12/2010 | Rawat |
| 7,856,234 | B2 | 12/2010 | Alizadeh-Shabdiz et al. |
| 7,916,661 | B2 | 3/2011 | Alizadeh-Shabdiz et al. |
| 7,999,742 | B2 | 8/2011 | Alizadeh-Shabdiz |
| 8,014,788 | B2 | 9/2011 | Alizadeh-Shabdiz et al. |
| 8,019,357 | B2 | 9/2011 | Alizadeh-Shabdiz et al. |
| 8,022,877 | B2 | 9/2011 | Alizadeh-Shabdiz |
| 8,054,219 | B2 | 11/2011 | Alizadeh-Shabdiz |
| 8,063,820 | B2 | 11/2011 | Alizadeh-Shabdiz |
| 8,090,386 | B2 | 1/2012 | Alizadeh-Shabdiz et al. |
| 2001/0053999 | A1 | 12/2001 | Feinberg |
| 2002/0055956 | A1 | 5/2002 | Krasnoiarov et al. |
| 2002/0173317 | A1 | 11/2002 | Nykanen et al. |
| 2003/0011511 | A1 | 1/2003 | King et al. |
| 2003/0043073 | A1 | 3/2003 | Gray et al. |
| 2003/0125045 | A1 | 7/2003 | Riley et al. |
| 2003/0146835 | A1 | 8/2003 | Carter |
| 2003/0186679 | A1 | 10/2003 | Challener et al. |
| 2003/0197645 | A1 | 10/2003 | Ninomiya et al. |
| 2003/0225893 | A1 | 12/2003 | Roese et al. |
| 2004/0019679 | A1 | 1/2004 | E et al. |
| 2004/0023669 | A1 | 2/2004 | Reddy |
| 2004/0039520 | A1 | 2/2004 | Khavakh et al. |
| 2004/0048640 | A1 | 3/2004 | Bae |
| 2004/0072577 | A1 | 4/2004 | Myllymaki et al. |
| 2004/0081133 | A1 | 4/2004 | Smavatkul et al. |
| 2004/0087317 | A1 | 5/2004 | Caci |
| 2004/0124977 | A1 | 7/2004 | Biffar |
| 2004/0157624 | A1 | 8/2004 | Hrastar |
| 2004/0160909 | A1 | 8/2004 | Sheynblat |
| 2004/0203847 | A1 | 10/2004 | Knauerhase et al. |
| 2004/0205234 | A1 | 10/2004 | Barrack et al. |
| 2005/0017898 | A1 | 1/2005 | Teranishi |
| 2005/0020266 | A1 | 1/2005 | Backes et al. |
| 2005/0037775 | A1 | 2/2005 | Moeglein et al. |
| 2005/0090266 | A1 | 4/2005 | Sheynblat |
| 2005/0105600 | A1 | 5/2005 | Culum et al. |
| 2005/0108306 | A1 | 5/2005 | Martizano Catalasan |
| 2005/0164710 | A1 | 7/2005 | Beuck |
| 2005/0192024 | A1 | 9/2005 | Sheynblat |
| 2005/0227711 | A1 | 10/2005 | Orwant et al. |
| 2005/0237967 | A1 | 10/2005 | Lee et al. |
| 2005/0285783 | A1 | 12/2005 | Harper |
| 2006/0009235 | A1 | 1/2006 | Sheynblat et al. |
| 2006/0040640 | A1 | 2/2006 | Thompson et al. |
| 2006/0046709 | A1 | 3/2006 | Krumm et al. |
| 2006/0049982 | A1 | 3/2006 | Wells |
| 2006/0063560 | A1 | 3/2006 | Herle |
| 2006/0078122 | A1 | 4/2006 | Dacosta |
| 2006/0089157 | A1 | 4/2006 | Casey et al. |
| 2006/0089160 | A1 | 4/2006 | Othmer |
| 2006/0170591 | A1 | 8/2006 | Houri |
| 2006/0193258 | A1 | 8/2006 | Ballai |
| 2006/0194568 | A1 | 8/2006 | Sharony |
| 2006/0197704 | A1 | 9/2006 | Luzzatto et al. |

(56) References Cited

U.S. PATENT DOCUMENTS

| | | |
|---|---|---|
| 2006/0221918 A1 | 10/2006 | Wang |
| 2007/0004428 A1 | 1/2007 | Morgan et al. |
| 2007/0052583 A1 | 3/2007 | Zhodzishsky et al. |
| 2007/0077945 A1 | 4/2007 | Sheynblat |
| 2007/0097511 A1 | 5/2007 | Das et al. |
| 2007/0100955 A1 | 5/2007 | Bodner |
| 2007/0109184 A1 | 5/2007 | Shyr et al. |
| 2007/0121560 A1 | 5/2007 | Edge |
| 2007/0126635 A1 | 6/2007 | Houri |
| 2007/0150516 A1 | 6/2007 | Morgan et al. |
| 2007/0167174 A1 | 7/2007 | Halcrow et al. |
| 2007/0216540 A1 | 9/2007 | Riley et al. |
| 2007/0217374 A1 | 9/2007 | Waxman |
| 2007/0232892 A1 | 10/2007 | Hirota |
| 2007/0244631 A1 | 10/2007 | Jung et al. |
| 2007/0268177 A1 | 11/2007 | Ahmed et al. |
| 2007/0279281 A1 | 12/2007 | Oda et al. |
| 2007/0286213 A1 | 12/2007 | Fodor et al. |
| 2007/0298761 A1 | 12/2007 | Bani Hani |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0032706 A1 | 2/2008 | Sheynblat et al. |
| 2008/0033646 A1 | 2/2008 | Morgan et al. |
| 2008/0079633 A1 | 4/2008 | Pon et al. |
| 2008/0111737 A1 | 5/2008 | Haverkamp et al. |
| 2008/0133336 A1 | 6/2008 | Altman et al. |
| 2008/0137626 A1 | 6/2008 | Choi et al. |
| 2008/0158053 A1 | 7/2008 | Watanabe |
| 2008/0176583 A1 | 7/2008 | Brachet et al. |
| 2008/0214192 A1 | 9/2008 | Soliman |
| 2008/0234533 A1 | 9/2008 | Vollum |
| 2008/0248741 A1 | 10/2008 | Alizadeh-Shabdiz |
| 2008/0248808 A1 | 10/2008 | Alizadeh-Shabdiz |
| 2008/0248809 A1 | 10/2008 | Gower |
| 2008/0261615 A1 | 10/2008 | Kalhan |
| 2008/0291086 A1 | 11/2008 | Walley et al. |
| 2009/0002237 A1 | 1/2009 | Nonoyama |
| 2009/0017841 A1 | 1/2009 | Lewis et al. |
| 2009/0042557 A1 | 2/2009 | Vardi et al. |
| 2009/0075672 A1 | 3/2009 | Jones et al. |
| 2009/0103503 A1 | 4/2009 | Chhabra |
| 2009/0121927 A1 | 5/2009 | Moshfeghi |
| 2009/0149197 A1 | 6/2009 | Morgan et al. |
| 2009/0161806 A1 | 6/2009 | Ananny et al. |
| 2009/0168843 A1 | 7/2009 | Waters et al. |
| 2009/0175189 A1 | 7/2009 | Alizadeh-Shabdiz et al. |
| 2009/0181695 A1 | 7/2009 | Wirola et al. |
| 2009/0187983 A1 | 7/2009 | Zerfos et al. |
| 2009/0189810 A1 | 7/2009 | Murray |
| 2009/0192709 A1 | 7/2009 | Yonker et al. |
| 2009/0196267 A1 | 8/2009 | Walker, Sr. |
| 2009/0231191 A1 | 9/2009 | Wu et al. |
| 2009/0251364 A1 | 10/2009 | Lorenz |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0039323 A1 | 2/2010 | Kosolobov et al. |
| 2010/0052983 A1 | 3/2010 | Alizadeh-Shabdiz |
| 2010/0195632 A1 | 8/2010 | Prabhu |
| 2010/0309051 A1 | 12/2010 | Moshfeghi |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298659 A1 | 12/2011 | Alizadeh-Shabdiz |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0007775 A1 | 1/2012 | Alizadeh-Shabdiz |
| 2012/0021759 A1 | 1/2012 | Chen et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0196621 A1 | 8/2012 | Alizadeh-Shabdiz et al. |
| 2012/0280866 A1 | 11/2012 | Alizadeh-Shabdiz |

FOREIGN PATENT DOCUMENTS

| | | |
|---|---|---|
| EP | 0346461 | 7/1993 |
| EP | 0762363 | 3/1997 |
| EP | 0810449 | 3/1997 |
| EP | 0592560 | 7/1997 |
| EP | 0860710 | 8/1998 |
| EP | 0776485 B1 | 8/2000 |
| EP | 1359714 A2 | 11/2003 |
| GB | 2180425 | 11/1989 |
| GB | 2291300 | 1/1996 |
| JP | 62284277 | 6/1986 |
| JP | 03-235562 A | 10/1991 |
| JP | 04-035345 A | 2/1992 |
| JP | 06003431 | 1/1994 |
| JP | 06148308 | 5/1994 |
| WO | WO-92/02105 | 2/1992 |
| WO | WO-95/14335 | 5/1995 |
| WO | WO-95/23981 | 9/1995 |
| WO | WO-96/20542 | 7/1996 |
| WO | WO-97/23785 | 6/1997 |
| WO | WO-9728455 | 8/1997 |
| WO | WO-9810538 | 3/1998 |
| WO | WO-9825157 | 6/1998 |
| WO | WO-03/021851 | 3/2003 |
| WO | WO-04/002185 A1 | 12/2003 |
| WO | WO-2005/004527 A1 | 1/2005 |
| WO | WO-2008/006077 A2 | 1/2008 |
| WO | WO-2009/149417 | 12/2009 |
| WO | WO-2010/005731 | 1/2010 |
| WO | WO-2011/008613 | 1/2011 |
| WO | WO-2011/041298 | 4/2011 |
| WO | WO-2011/041430 | 4/2011 |
| WO | WO-2012061595 | 5/2012 |

OTHER PUBLICATIONS

"Best Practices for Hunting Down & Terminating Rogue Wireless LANs (WLANs)," AirDefense, Inc., available at www.airdefense.net, 2002-2005, 7 pages.

"Calculate AP Physical Location," NetStumbler.org Forums, Oct. 2012, 7 pages, available at http://www.netstumbler.org/netsstumbler/calculate-ap-physical-location-t9813.html.

"Current Kismet Readme," Kismet, Nov. 2012, 47 pages, available at http://kismetwireless.net/documentation.shtml.

"Distributed Wireless Security Auditor," IBM Research, Nov. 2012, 3 pages, available at http://www.research.ibm.com/gsal/dwsa.

"Ekahau Positioning Engine 2.0: 802.11-based Wireless LAN Positiioning System," Ekahau Technology Document, Nov. 2002, 19 pages.

"GPSDRIVE," Nov. 2012, available at http://gpsdrive.sourceforge.net/gpsdrive_manual-en.html, 13 pages.

"Indoor Radio Propagation," Spread Spectrum Scene, , Nov. 2012, 7 pages, available at http://sss-mag.com/indoor.html.

1990-1991 Aviation System Capacity Plan, U.S. Department of Transportation, FAA. Dec. 20, 1990. 323 pages.

(56) References Cited

OTHER PUBLICATIONS

A Unique Solution, "HighwayMaster: Becoming the Mobile Communications System of Choice by Owner-Operators," Nov./Dec. 1994. 3 pages.
Adelstein et al., "Physically Locating Wireless Intruders," Journal of Universal Computer Science, vol. 11, No. 1, 2005, pp. 4-19.
AIM/FAR 1994, Airman's Information Manual / Federal Aviation Regulations: Section 2. Radio Communications Pharaseology and Techniques, Tab Aero Staff. 1994. 5 pages.
AJ Systems, Final Report and GPS System Specification for Shipboard Tacan Replacement. Submitted to Naval Air Development Center. Nov. 8, 1991. 195 pages.
Ambrosch et al., The Intelligent Network, a Joint Study by Bell Atlantic, IBM and Siemens, Springer-Verlag, IBSN 3-540-50897-X, 1989, Chapter 9, 18 pages.
Antonio, et al, "OmniTRACS: A commercial Ku-Band mobile satellite terminal and its applicability to military mobile terminals," 1988 IEEE Military Communications Conference, Oct. 23-26, 1998. 5 pages.
ASR-9 System, Instruction Book Field maintenance, Federal Aviation Administration, Nov. 2001. 410 pages.
Author Unknown, "LocalePoints," Newbury Networks, available at least as early as Oct. 2004, at http://replay.waybackmachine.org/20041009170934/hhttp://www.newburynetworks.com/products/coretech.php?localepoints, last accessed Apr. 14, 2011, 1 page.
Author Unknown, "LocaleServer," Newbury Networks, available at least as early as Oct. 2004, at http://replay.waybackmachine.org/20041010054718/http://www.newburynetworks.com/products/coretech.php, last accessed Apr. 14, 2011, 1 page.
Author Unknown, "Mobile Applications Suite," Pango, PanGo Mobile Applications Suite, available at leasst as early as Aug. 2003, at http://replay.waybackmachine.org/20030825161534/http://pangonetworks.com/mobile.htm and http://replay.waybackmachine.org/20031002103310/http://pangonetworks.com/products.htm, last accessed Apr. 14, 2011, 1 page.
Author Unknown, "Proximity Platform," Pango, PanGo Mobile Applications Suite, available at leasst as early as Aug. 2003, at http://replay.waybackmachine.org/20031002102757/http://pangonetworks.com/proximity.htm and http://replay.waybackmachine.org/20031002103310/http://pangonetworks.com/products.htm, last accessed Apr. 14, 2011, 1 page.
Author Unknown, Bluesoft, Inc., Aeroscout, available at http://replay.waybackmachiine.org/20030802052607/http:/bluesoft-inc.com/wlan.asp, Accessed on Apr. 14, 2011, 1 page.
Author Unknown, Netstumbler Blog Posting, "Wardriving as a Proxy for Wi-Fi Location," available at http://www.netstumbler.org/news/wardriving-as-a-proxy-for-wi-fi-gps-location-t10762.html, May 11, 2004-May 17, 2004, last accessed Apr. 13, 2004, 7 pages.
Bahl et al., "RADAR: An In-Building RF-based User Location and Tracking System," Proceedings IEEE INFOCOM 2000, pp. 775-784.
Balachandran et al., "Wireless Hotspots: Current Challenges and Future Directions," WMASH'03, Sep. 2003, 9 pages.
Battiti, et al., "Wireless LANs: From WarChalking to Open Access Networks," Mobile Networks and Applications 10, pp. 275-287, 2005.
Before the Federal Communications Commission, "Notice of Proposed Rule Making," In the Matter of: Revision of the Commission's rules to ensure compatibility with enhanced 911 emergency calling systems, Oct. 19, 1994. 53 pages.
Before the Federal Communications Commission, "Report and Order and Further Notice of Proposed Rulemaking," In the Matter of: Revision of the Commission's Rules to Ensure Compatibility with Enhanced 911 Emergency Calling Systems, Jul. 26, 1996. 98 pages.
Before the Federal Communications Commission, Comments of AT&T Corp, In the matter of: Revision of the Commission's Rules to Ensure Compatibility with Enhanced 911 Emergency Calling Systems. Jan. 9, 1995. 25 pages.
Bhasker et al., "Employing User Feedback for Fast, Accurate, Low-Maintenance Geolocationing," Proceeding PERCOM '04 Proceedings of the Second IEEE International Conference on Pervasive Computing and Communications (PerCom'04), IEEE Computer Society Washington, DC., USA, 2004, 10 pages.
Birkland, "Track, Talk, Tell: On-board communications systems, and the software that gives those systems power, give fleets the opprotunity to track trucks and cargo, talk to drivers and receive vital vehicle systems information," Management Techniques, Fleet Equipment, Jun. 1994. 6 pages.
Bjorndahl et al., "CME20—A Total Solution for GSM Networks," Ericsson Review No. 3, 1991, 8 pages.
Bogue, "Using NetStumbler and MiniStumbler to Find Rogue Access Points on Wireless Networks," TechRepublic, CIO Top 50 6th Annual Event, 2012, 5 pages.
Branch et al., "Autonomic 802.11 Wireless LAN Security Auditing," IEEE Computer Society, 2004, pp. 56-65.
Brewin, "IBM Develops Tool to Detect Rogue Wireless LAN Access Points," Nov. 2012, 5 pages, available at http://www.computerworld.com/s/article/72065/IBM_develops_tool_to_detect_rogue_wi.
Bronson, et al, "II Morrow's Loran-C Based Vehilce Tracking System," Presented at Nav 85 Land Navigation and Location for Mobile Applications, Sep. 9-11 1985, 13 pages.
Brown, "Navigation, Surveillance, and Communications Services within the Province of Ontario," Journal of the Institute of Navigation, vol. 35, No. 4, Winter 1988-1989. 7 pages.
Buccafurno, "The Philadelphia Story," TE&M Special Report 911, Dec. 1987, pp. 68-72.
Byers et al., "802.11B Access Point Mapping," Communications of the ACM, May 2003, vol. 46, No. 5, pp. 41-46.
C.J. Driscoll & Associates, "Survey of Location Technologies to Support Mobile 9-1-1," Survey Conducted for State of California, Jul. 1994. 59 pages.
California Legislature, Senate on Energy and Public Utilities, Joint Interim Hearing on the 911 Emergency Responsne System—An Overview of its Effectiveness, Nov. 21, 1990, 107 pages.
Candler, "Tracking all Trucks," Transportation, Nation's Business, Dec. 1994. 3 pages.
Capkun et al., "GPS-free Positioning in Mobile Ad Hoc Networks," Cluster Computing, 5, pp. 157-167, 2002.
Carroll, "Availability Performance Comparisons of Combined Loran-C/GPS and Standalone GPS Approach Navigation Systems," Position Location and Navigation Symposium, 1994., IEEE. Apr. 11-15, 1994. pp. 77-83.
Carter, "Using Loran-C for Automatic Vehicle Monitoring," Navigation: Journal of the Institute of Navigation, vol. 29, No. 1, Spring 1982. 9 pages.
Carter, et al, "Using Cellular Telephones for Automatic Vehicle Tracking," Presented at Nav 85 Land Navigation and Location for Mobile Applications, Sep. 9-11, 1985. 10 pages.
Cassidy, "HighwayMaster Goes Flat-Out in Communications Race," Transport Topics, Aug. 8, 1994. 2 pages.
Castro, "A Probablistic Room Location Service for Wireless Networked Environments," Ubicomp 2001: Ubiquitous Computing, International Conference, Atlanta, Georgia, Sep. 30-Oct. 2, 2001, Proceedings, 10 pages.
Chadwick, "Projected Navigation System Requirements for Intelligent Vehicle Highway Systems (IVHS)." Proceedings of the 7th International Technical Meeting of the Satellite Division of the Institute of Navigation (ION GPS 1994), Sep. 1994. pp. 485-490.
Chambers, et al., "A Comparison of Automatic Vehicle Tracking Systems," Navigation: Journal of the Institute of Navigation, vol. 21, No. 3, Fall 1974, pp. 208-222.
Chawathe et al., "A Case Study in Building Layered DHT Applications," SIGCOMM '05 Proceedings of the 2005 Conference on Applications, Technologies, Architectures, and Protocols for Computer Communications, pp. 97-108, Jan. 2005, 15 pages.
Cobb, et al., "Precision Landing Tests with Improved Integrity Beacon Pseudolites," Department of Aeronautics and Astronautics, Stanford University, Sep. 1995. 7 pages.
Connelly et al., "A Toolkit for Automatically Constructing Outdoor Radio Maps," Proceedings of the International Conference on Information Technology: Coding and Computing, ITCC, Apr. 4-6, 2005, Las Vegas, Nevada, IEEE, 7 pages.

(56) References Cited

OTHER PUBLICATIONS

Cortland, "Loran-C Vehicle Tracking in Detroit's Public Safety Dispatch System," Navigation: Journal of the Institute of Navigation, vol. 36, No. 3, Fall 1989. 11 pages.

Crow, "Auditing for Rogue Wireless Access Points in a Large Corporate Campus," Global Information Assurance Certification Paper, Sep. 18, 2003, 21 pages.

Dayharsh, et al., "Update on the National Emergency No. 911," IEEE Transactions on Vehicular Technology, vol. VT-28, No. 4, Nov. 1979, pp. 292-297.

Delong, "Making 911 Even Better," Telephony Integrating Voice and Data Communications, Telephoney, Dec. 1987, 6 pages.

DeNigris et al., "Ehanced 911: Emergency Calling With a Plus," Bell Laboratories Record, Mar. 1980, 6 pages.

DiEsposti et al., "Benefits and Issues on the Integration of GPS with a Wireless Communications Link," 29th Annual PTTI Meeting, Dec. 1997, pp. 391-398.

Eckerson, "Users Test Toll-Free Net Access Options," Management Strategies, Network World, Dec. 1991/Jan. 1992, pp. 17-18.

Ekahau Client 3.0 Build 136 Release Notes, Available at http://replay.waybackmachine.org/20030929003821/http:/www.ekahau.com/products/client, Apr. 14, 2011, 4 pages.

Ekahau, "Ekahau Site Survey 1.0, Maximize Coverage—Minimize Channel Interference," Available at http://replay.waybackmachine.org/20030807204446/http:/www.ekahau.com/products/siites, Apr. 14, 2011, 2 pages.

Ekahau, "Technology Overview", Available at http://replay.waybackmachine.org/20031008125411/http:/www.ekahau.com/products, Apr. 14, 2011, 8 pages.

Ekahau, "Technology Overview," Available at http://replay.waybackmachine.org/2003/20031008125411/http:/www.ekahau.com/products, Apr. 14, 2011, 1 page.

Ekahau, "Why Ekahau Site Survey?," Available at http://replay.waybackmachine.org/20030801080918/http:/www.ekahau.com/products/sites, Apr. 14, 2011, 1 page.

Ellison, "Exploiting and Protecting 802.11b Wireless Networks," Nov. 2012, 8 pages, available at http://www.extremetech.com/computing/57646-exploiting-and-protecting-80211b-wireless.

Elnahrawy, et al., "Using Area-Based Presentations and Metrics for Localization Systems in Wireless LANs," Proceedings of the 29th Conference on Local Computer Networks, IEEE, LCN 2004, Tampa, Florida, Nov. 16-18, 2004, 9 pages.

Enge, "Combining Pseudoranges from GPS and Loran-C for Air Navigation," Position Location and Navigation Symposium, 1990, Mar. 20-23, 1990. pp. 36-43.

Etter, "A Guide to Wardriving and Detecting Wardrivers," SANS Institute InfoSec Reading Room, 2002, 16 pages.

FAA Historical Chronology, 1926-1996. 303 pages.

Farradyne Systems, Inc. et al., TravTek Evaluation Plan—Final, Prepared for Federal Highway Administration, Apr. 4, 1991. 62 pages.

Fernandez et al., "GPS Navigation Subsystem for Automatic Vehilce Location Systems," Presented at the Nav 90 Land Navigation and Information Systems Conference, Sep. 18-20, 1990. 12 pages.

Foust, "Identifying and Tracking Unauthorized 802.11 Cards and Access Points," The Magazine of Usenix & Sage, Aug. 2002, vol. 27, No. 4, 13 pages.

Frederickson, "Approximation Algorithms for Some Postman Problems," Journal of the Association for Computing Machinery, vol. 26, No. 3, Jul. 1979, pp. 538-554.

French, "MAP Matching Origins Approaches and Applications," Proceedings of the Second International Symposium on Land Vehicle Naviation, Jul. 1989, 28 pages.

French, "The Evolving Roles of Vehicular Navigation," Navigation: Journal of the Institute of Navigation, vol. 34, No. 3, Fall 1987, pp. 212-228.

French, et al., "A Comparison of IVHS Progress in the United States, Europe and Japan," Dec. 31, 1993, Prepared by R.L. French & Associates for IVHS America, 216 pages.

Frye, "GPS Signal Availability in Land Mobile Applications," Navigation: Journal of the Institute of Navigation, vol. 36, No. 3, Fall 1989. 15 pages.

Galijan et al., "Results of a Study into the Utility of Carrier Phase GPS for Automated Highway Systems," The Institute of Navigation, Proceedings of ION GPS-94, Sep. 20-23, 1994. pp. 533-541.

Global Positioning & Navigation News, AVL Markets: More than Position Reporting, vol. 6., No. 16. Aug. 8, 1996. 3 pages.

GPS World News and Applications of the Global Positioning System, GPS World Newsletter, Apr. 11, 1994. 4 pages.

GPS World News and Applications of the Global Positioning System, GPS World Newsletter, Jul. 1994. 2 pages.

GPS World Newsletter, Sep. 9, 1993. 2 pages.

Griswold et al., "ActiveCampus: Experiments in Community-Oriented Ubiquitous Computing," IEEE, Oct. 2004, pp. 73-81.

Harvey et al., "Call Center Solutions," AT&T Technical Journal, Sep./Oct. 1991, 11 pages.

Hatami et al., "A Comparative Performance Evaluation of RSS-Based Positioning Algorithms Used in WLAN Networks," 2005 IEEE Wireless Communications and Networking Conference, Mar. 13-17, 2005, New Oreleans, LA, 8 pages.

Head, "Intelligent Network: A Distributed System," IEEE Communications Magazine, Dec. 1988, 5 pages.

Henderson et al., "The Changing Usage of a Mature Campus-Wide Wireless Network," MobiCom '04, Sep. 26-Oct. 1, 2004, 15 pages.

Hightower et al., "A Survey and Taxonomy of Location Systems for Ubiquitous Computing," Technical Report UW-CSE 01-08-03, Aug. 2001, 29 pages.

Hightower et al., "Location Sensing Techniques," IEEE Computer Magazine, Aug. 2001, 8 pages.

Hightower et al., "The Location Stack," Intel Research Seattle, Dieter Fox, University of Washington, IRS-TR-03-008, Jul. 2003, 13 pages.

Highway Master Mobile Communication & Information Systems, Press Release for Immediate Release, Dec. 16, 1994. 2 pages.

Highway Master Mobile Communication & Information Systems, Press Release for Immediate Release, Jan. 11, 1995. 2 pages.

Highway Master Mobile Communication & Information Systems, Press Release for Immediate Release, Jan. 12, 1995. 2 pages.

Hojo et al., "Land-Mobile GPS Receiver," Proceedings of the 3rd International Technical Meeting of the Satellite Division of the Institute of Navigation (ION GPS 1990), Sep. 1990. pp. 183-190.

Honeywell, Inc., "A310/A300 Flight Management System Pilot's Guide," Dec. 1993, Rev. 1, 441 pages.

Hong et al., "Privacy and Client-Based Discovery of Location," 10 pages, retrieved at http://www.cs.cmu.edu/jasonh/publications/, Dec. 8, 2003.

Hong et al., "Privacy and Security in the Locatin-Enhanced World Wide Web," In Proceedings of the Workshop on Privacy at Ubicomp 2003, Oct. 2003, 5 pages.

Honig, "The Realities of Service Creation on Switching Systems Through Attached Processors," XIII International Switching Symposium, Session B9, Paper #4, Proceedings vol. VI, May 27-Jun. 1, 1990, 4 pages.

Howe, "The Feasibility of Applying the Active TvTime System to Automatic Vehicle Location," Navigation: Journal of the Institute of Navigation, vol. 21, No. 1, Spring 1974. 7 pages.

Huffman Coding, Wikipedia, accessed at http://en.wikipedia.org/wiki/Huffman_coding on Dec. 28, 2010. 10 pages.

Hunter et al., "Land Navigation and Fleet Management with GPS, Loran, and Dead Reckoning Sensors," IEEE, 1988, pp. 54-60.

Hunter, "The Sources of Innovation in New Jersey Bell Switching Services," Master of Science Thesis, Massachusetts Institute of Technology, Sloan School of Management, Jun. 1991, 105 pages.

Hurley, et al., "WarDriving: Drive, Detect, Defend, A Guide to Wireless Security," Syngress Publishing, Nov. 2012, 3 pages, available at http://net-security.org/review.php?id=144.

ICAO Circular, Secondary Surveillance Radar Mode S Advisory Circular, International Civil Aviation Organization, 1983. 44 pages.

II Morrow Inc., Kern County Adds Eyes, Mar. 10, 1986. 8 pages.

II Morrow Inc., Press Release for Immediate Release: II Morrow's VTS finds new application, Oct. 13, 1986. 2 pages.

II Morrow Inc., Press Release for Immediate Release: Lafayette Parish adds Vehicle Tracking, Sep. 8, 1986. 2 pages.

(56) References Cited

OTHER PUBLICATIONS

II Morrow Inc., Press Release for Immediate Release: Los Alamos selects II Morrow's VTS, Sep. 9, 1986. 2 pages.
II Morrow Inc., Press Release for Immediate Release: Pinellas County Florida Chooses II Morrow, Sep. 4, 1986. 2 pages.
II Morrow Inc., Press Release for Immediate Release: Punta Gorda Florida Adds Police Car Tracking System, Aug. 28, 1986. 2 pages.
II Morrow Inc., The vision to take fleet management one step further, 1992. 8 pages.
II Morrow Inc., Vehicle Tracking System References, 1986. 6 pages.
Inman, et al., "TravTek Evaluation Rental and Local User Study," U.S. Department of Transporation, Federal Highway Administration, Mar. 1996, Publication No. FHWA-RD-96-028, 105 pages.
Inman, et al., "TravTek Evaluation Yoked Driver Study," U.S. Department of Transportation and Federal Highway Administration, Oct. 1995, Publication No. FHWA-RD-94-139, 101 pages.
Irvine Police Department: Memorandum by Lt. Gene Norden. 1986. 3 pages.
Jin et al., "802.11-based Positioning System for Context Aware Applications," IEEE, 2003, pp. 929-933.
Junius et al., "New Methods for Processing GSM Radio Measurement Data: Applications for Locating, Handover, and Network Management," Communication Networks, Aachen University of Technology, 1994. pp. 338-342.
Kang et al., "Extracting Places from Traces of Locations," WMASH '04 Proceedings of the 2nd ACM International Workshop on Wireless Mobile Applications and ervices on WLAN Hotspots, Oct. 2004, pp. 110-118.
Kawabata et al., "Estimating Velocity Using Diversity Reception," IEEE, 1994, 4 pages.
Kennedy et al., "Direction Finding and "Smart Antennas" Using Software Radio Architectures," IEEE Communications Magazine, May 1995. pp. 62-68.
Kent et al., "Position Estimation of Access Points in 802.11 Wireless Networks," White Paper, Sep. 2003, Lawrence Livermore National Laboratory, Livermore, California, 10 pages.
Kirtner, et al., "The Application of Land Use/Land Cover Data to Wirleess Communication System Design," Proceedings of the ESRI User Conference, 1998, 16 pages.
Komar et al., "Location Tracking and Location Based Service Using IEEE 802.11 WLAN Infrastructure," European Wireless 2004, Feb. 24-27, 2004, 7 pages.
Krumm et al., "The NearMe Wireless Proximity Server," UbiComp 2004, LNCS 3205, pp. 283-300.
Kugler et al., "Combined Use of GPS and Loran-C in Integrated Navigation Systems," IEEE, 1996. pp. 161-168.
Kwan, "GLOBALSTAR: Linking the World via Mobile Connections," IEEE Intl. Symposium on Personal, Indoor & Mobile Radio Communications, pp. 318-223, Sep. 25, 1991.
Kwan, "Graphic Programming Using Odd or Even Points," Chinese Mathematics, vol. 1, No. 3, 1962, Translation of Acta Mathematica Sinica, 10, No. 3, 1960, 7 pages.
Lachapelle et al., "Analysis of GPS and Loran-C Performance for Land Vehicle Navigation in the Canadian Rockies," IEEE, 1992. pp. 504-508.
Lachapelle et al., "Analysis of Loran-C Performance in the Pemberton Area, B.C." Canadian Aeronautics and Space Journal, vol. 38, No. 2, Jun. 1992, pp. 52-61.
Lachapelle et al., "GPS/Loran-C: An Effective System Mix for Vehicular Navigation in Mountainous Areas," Journal of the Institute of Navigation, vol. 40, No. 1, Spring 1993. pp. 19-34.
Lackey et al., "Wireless Intrusion Detection," Apr. 2003, IBM Global Services, 16 pages, retrieved from www.forum-intrusion.com/wireless_intrusion_detection.pdf.
LaMarca et al., "Place Lab's First Step: A Location-Enhanced Conference Guide," IEEE Spectrum at 51-54, Dec. 2004, 3 pages.
LaMarca et al., "Place Lab: Bootstrapping Where-ware," Place Lab, Jul. 23, 2011, 19 pages, retrieved from www.placelab.org.
LaMarca et al., "Self-Mapping in 802.11 Location Systems," Intel Corporation, 2005, 18 pages.
LaMarca, et al., "Finding Yourself," IEEE Spectrum, Dec. 2004, 3 pages.
Lappin, "Truckin'," Wired, Issue 3.01, Jan. 1995. Accessed on Aug. 27, 2012 on www.wired.com/wired/archive/3.01/truckin.html. 11 pages.
Lee, "Trucking Takes the High (Tech) Road," Radio Resource Magazine, Jan.-Feb. 1994, 9 pages.
Lee, "Wireless Surveying on the Pocket PC," May 2004, 7 pages, available at http://www.oreillynet.com/lpt/a/4876.
Leslie, "Rogue Wireless Access Point Detection and Remediation," Global Information Assurance Certification Paper, Sep. 2004, 15 pages, retrieved from www.giac.org/paper/gsec/4060/rogue-wireless-access-point-detection-remediation/106460.
Letchner et al., "Large-Scale Localization from Wireless Signal Strength," In Proc. of the National Conference on Artificial Intelligence (AAAI), 2005, 6 pages.
Lorincz, et al., "MoteTrack: A Robust, Decentralized Approach to RF-Based Location Tracking," First International Workshop, LoCA 2005, LNCS 3479, Oberpfaffenhofen, Germany, May 12-13, 2005 Proceedings, 21 pages.
Machalaba, "Long Haul: Trucking Firms Face Driver Shortage, Idling Some Rigs and Causing Delays for Shippers", The Wall Street Journal, Dec. 28, 1993. 2 pages.
Magnavox, "Presenting the Most Advanced AVLS Available", 1988. 6 pages.
Mallinder, "The Final Count-Down to GSM, GSM System Aspects," 1991 Pan European Digital Cellular Radio Conference, Feb. 5-6, 1991, Acropolis Conference Centre, Nice, France, 12 pages.
Mammano et al., "PATHFINDER System Design," IEEE, 1989. pp. 484-488.
Marcelo, "Vehicle Location System Serves Public Safety Agencies," Mobile Radio Technology, vol. 4, Issue 12, Dec. 1986. 5 pages.
Maturino-Lozoya et al., "Pattern Recognition Techniques in Handoff and Service Area Determination," IEEE Vehicular Technology Conference, Jun. 1994. pp. 96-100.
Mele, "Mid-America Dairymen Proves That It Pays," Fleet Owner, 1 page. 1994.
Milk & Liquid Food Transporter, "Mid-Am installs Voice Communications," vol. 34, No. 5, May 1994. 1 page.
Milner, "NetStumbler v0.4.0 Release Notes," available at http://downloads.netstumbler.com/downloads/netstumbler_v0.4.0_release_notes.pdf, Apr. 18, 2007, 10 pages.
Morris, et al., "Omega Navigation System Course Book," U.S. Department of Transportation, United States Coast Guard, vol. 1, Jul. 1994, 60 pages.
Myllymaki et al., "Location Aggregation from Multiple Sources," IBM Almaden Research Center, MDM '02 Proceedings of the Third International Conference on Mobile Data Management, pp. 131-138, IEEE Computer Society Washington, DC, 2002.
Ndili, "GPS Pseudolite Signal Design," Presented at ION-GPS-94, Sep. 1994. 8 pages.
New Jersey Bell Network Proposal, Sent by Gojanovich and DePaola on Nov. 20, 1989 to the Network Subcommittee of the State of New Jersey, 9-1-1, 34 pages.
Papadimitriou, "On the Complexity of Edge Traversing," Journal of the Association for Computing Machinery, vol. 23, No. 3, Jul. 1976, pp. 544-554.
Parish, "Case Studies of Market Research for Three Transportation Communication Products," U.S. Dept of Transportation, Mar. 1994. 70 pages.
Parviainen, et al., Mobile Information Systems Impact Study, Ontario Ministry of Transporation, Aug. 1988, 236 pages.
Perlstein et al., "Designing and Implementing Automatic Vehicle Location," Mobile Radio Technology, Jan. 1989. 6 pages.
Perlstein, "Automatic Vehicle Location Systems: A Tool for Computer Aided Despatch Systems of the Future," IEEE, 1989. pp. 186-193.
Perry, "In Search of the Future of Air Traffic Control," IEEE Spectrum, Aug. 1997, pp. 19-35, 18 pages.
Peterson et al., "Evaluation of Radionavigation Systems in an Urban Environment," Proceedings of the 1995 National Technical Meeting of the Institute of Navigation, Jan. 1995. pp. 293-302.

(56) References Cited

OTHER PUBLICATIONS

Pilley et al., "Airport Navigation and Surveillance Using GPS and ADS," Proceedings of the 4th International Technical Meeting of the Satellite Division of the Institute of Navigation (ION GPS 1991), Sep. 1990. pp. 363-371.

Post, "Real-Time Linear Ensembler Averaging LORAN Receiver Architecture," The Institute of Navigation, Jun. 27-29, 1989. pp. 67-75.

Raniwala, et al., "Deployment Issues in Enterprise Wireless LANs," RPE Report, Sep. 2003, 36 pages.

Rappaport, "Position Location Using Wireless Communications on Highways of the Future," IEEE Communications Magazine, Oct. 1996. pp. 33-41.

Refrigerated Transport, "Mid-America Dairymen Picks HighwayMaster," Mar. 1994. 1 page.

Riley et al., "Vehicle Tracking System for Salem, Oregon Police Department," The Instutute of Navigation, Proceedings of the National Technical Meeting, Jan. 21-23, 1986. pp. 89-94.

Robinson et al., "Received Signal Strength Based Location Estimation of a Wireless LAN Client," 2005 IEEE Wireless Communications and Networking Conference, vol. 4, Mar. 13-17, 2005, New Orleans, LA, 6 pages.

Rothblatt, "The First GPS Satellite Radio Optimized for Automatic Vehicle Loaction," Position Locaiton and Navigation Symposium, Mar. 23-27, 1992. pp. 261-263.

Saha et al., "Location Determination of a Mobile Device Using IEEE 802.11b Access Point Signals," 2003 IEEE Wireless Communications and Networking, Mar. 16-20, 2003, New Orleans, Louisiana, Conference Record, 7 pages.

Saldin, "Magnavox Automatic Vehicle Loaction Pilot System for the Toronto Department of Ambulance Services," Vehicle Navigation & Information Systems, IEEE, Sep. 11-13, 1989. pp. 194-201.

Santo, "Enables Reliable Autopilot Aircraft Touchdowns," Electronic Engineering Times, Nov. 14, 1994. 7 pages.

Schilit et al., "Challenge: Ubiquitous Location-Aware Computing and the "Place Lab" Initiative," WMASH '03 Proceedings of the 1st ACM International Workshop on Wireless Mobile Applications and Services on WLAN Hotspots, Sep. 2003, pp. 29-35.

Schilit, et al., "Bootstrapping the Location-enhanced World Wide Web," Workshop on Location-Aware Computing (at UbiComp 2003), Seattle, WA, Oct. 2003, 4 pages.

Schlachta et al., "Interoperability versus Integration of Omega and GPS," The Journal of Navigation, vol. 43, No. 2, May 1990. pp. 229-237.

Schmandt et al., "The New Urban Infrastructure, Cities and Telecommunications," Praeger Publishers, 1990, ISBN: 0-274-93591-4, 28 pages.

Shih, "Wireless LAN Location System," A Thesis Submitted for the Degree of Master of Engineering, Nov. 2003, School of Information Technology and Electrical Engineering, The University of Queensland, 98 pages.

Shipley, "802.11b War Driving and LAN Jacking," DEFCON 9 Conference, Las Vegas, Nevada, USA, Jul. 13-15, 2001, available at http://www.defcon.org/html/links/dc-archives/dc-9-archive.html, last accessed Apr. 13, 2011, video and transcript, 49 pages.

Shipley, "Open WLANs the early results of war Driving," DEFCON9 Conference 802.11b War Driving Presentation, 39 pages, 2001.

Skoblicki, "Automatic Vehicle Location (AVL) Using GPS Enhanced Dead Reckoning," Presented at VNIS 1991 International Conference on Vehicle Navigation & Information Systems, Oct. 22, 1991. 9 pages.

Small et al., "Determining User Location for Context Aware Computing Through the Use of a Wireless LAN Infrastructure," Dec. 2000, retrieved from http://www.ices.cmu.edu/reports/040201/pdf. 8 pages.

Spielman et al., Java and GIS, Part 1: Intro to GIS, Feb. 2004, available at http://today.java.net/pub/a/today/2004/02/16/gis.html, last accessed Apr. 14, 2011, 4 pages.

Spielman et al., Java and GIS, Part 2: Mobile LBS, Apr. 2004, available at http://today.java.net/pub/a/today/2004/04/01/gis.html, last accessed Apr. 14, 2011, 6 pages.

Stein et al., "Psuedolite-Aided GPS: A Comparison," IEEE Position Location and Navigation Symposium, 1988. pp. 329-333.

Sterling, et al., The Iridium System—A Revoluntionary Satellite Communications System Developed with Innovative Applications of Technology, IEEE Communications Society, 1991, Milicom '91, pp. 0436-0440.

Stewart, "Vehicle Location and Position Monitoring System Using Satellite Navigation and Cellular Telephone," IEEE Digest No. 112, p. 7/1-15, Jun. 8, 1993. 15 pages.

Stone, "Kismet & GPSdrive: Wireless Network Sniffling with Open Software," UKUUG Leeds, 2004, 32 pages.

Taheri et al., "Location Fingerprinting on Infrastructure 802.11 Wireless Local Area Networks," Proceedings of the 29th Annual IEEE International Conference on Local Computer Networks (LCN'04), Nov. 16-18, 2004, Tampa, Florida, 9 pages.

Tanabe et al., "Experimental Validation of GPS-INS-STAR Hybrid Navigation System for Space Autonomy," Acta Astronautica, vol. 21, No. 5, 1990. pp. 295-308.

Taylor, "TravTek—Information and Services Center," SAE Technical Paper 912823, 1991. Author: Kent B. Taylor, American Automobile Assoc. 12 pages.

Terminal Equipment and Protocols for Telematic Services, CCITT, The International Telegraph and Telephone Consultative Committee, International Telecommunication Union, Sep. 1992, 186 pages.

Texas Advisory Commission on Intergovernmental Relations, "Implementing 9-1-1 Systems in Texas: Legal and Institutional Background," Jun. 1987, 61 pages.

The Intelligent Highway, vol. 4, Issue 18, Mar. 18, 1994. 3 pages.

Thrall of the U.S. Coast Guard, "Advantages of Interoperability to the Prudent Navigator," Proceedings of the 48th Annual Meeting of the Institute of Navigation, Jun. 1992. pp. 47-50.

Torrone, "How-To Tuesday: War Kayaking," Nov. 2012, 5 pages, available at www.engadget.com/2004/06/22-how-to-Tuesday-war-kayaking.

Trav-Tek System Architecture Evaluation, U.S. Department of Transporation, Federal Highway Administration, Jul. 1995, Publication No. FHWA-RD-94-141, 156 pages.

U.S. Department of Transportation FAA Advisory Circular, Airworthiness Approval of Global Positioning System (GPS) Navigation Equipment for Use as a VFR and IFR Supplemental Navigation System, AC No. 20-138, May 25, 1994. 33 pages.

U.S. Department of Transportation FAA Advisory Circular, Airworthiness Approval of Loran-C Navigation Systems for Use in the U.S. National Airspace System (NAS) and Alaska, AC No. 20-121A, Aug. 24, 1988. 21 pages.

U.S. Department of Transportation FAA Advisory Circular, Airworthiness Approval of Navigation or Flight Management Systems Integrating Multiple Navigation Sensors, AC No. 20-130A, Jun. 14, 1995. 50 pages.

U.S. Department of Transportation FAA Advisory Circular, Airworthiness Approval of Omega/VLF Navigation Systems for Use in the U.S. National Airspace System (NAS) and Alaska, AC No. 20-101C, Sep. 12, 1988. 31 pages.

U.S. Department of Transportation FAA Advisory Circular, Approval of Flight Management Systems in Transport Category Airplanes, AC No. 25-15, Nov. 20, 1989. 30 pages.

U.S. Government Memorandum from Keegan to Caton regarding TR45 Joint Experts Meeting Report. Oct. 28, 1994. 25 pages.

Van Aerde et al., "TravTek Evaluation Modeling Study," U.S. Department of Transportation, Federal Highway Administration, Mar. 1996, 134 pages.

van Graas, "Hybrid GPS/Loran-C: A Next-Generation of Sole Means Air Navigation," A Dissertation Presented to the Faculty of the College of Engineering and Technology, Ohio University, Nov. 1988, 185 pages.

van Graas, "Multisensor Signal Processing Techniques (Hybrid GPS/Loran-C with RAIM)," U.S. Department of Transportation, Federal Aviation Administration, Sep. 1991.

(56) References Cited

OTHER PUBLICATIONS van Willigen et al., "Eurofix: GNSS Augmented Loran-C & Loran-C Augmented GNSS," Proceedings of the 1995 National Technical Meeting of the Institute of Navigation, Jan. 1995. pp. 337-344.
Waid et al., "Relative GPS Using DME-TACAN Data Link," Proceedings of the 7th International Technical Meeting of the Satellite Division of the Institute of Navigation (ION GPS 1994), Sep. 1994. pp. 851-861.
Wallace, "Domino's Delivers Using New Call Routing Service," Network World, vol. 8, No. 32, Aug. 1991, 2 pages.
Wang et al., "Two New Algorithms for Indoor Wireless Positioning System (WPS)," Proceedings of the 17th International Technical Meeting of the Satellite Division of the Institute of Navigation, 2004, 8 pages.
Weseman, "Loran-C: Present and Future," Journal of the Institute of Navigation, vol. 29, No. 1, Spring 1982. pp. 7-21.
Whitcomb, "Using Low Cost Magnetic Sensors on Magnetically Hostile Land Vehicles," IEEE, 1988. pp. 34-35.
Wikipedia, "Delta Encoding," Accessed at http://en.wikipedia.org/wiki/Delta_encoding on Dec. 28, 2010. 5 pages.
Wilson et al., "A Lagrangian Drifter with Inexpensive Wide Area Differential GPS Positioning," Prospects for the 21st Century, Conference Proceedings, IEEE, Sep. 23-26, 1996. pp. 851-856.
International Search Report and Written Opinion of the International Search Authority, The United States Patent and Trademark Office, for International Application No. PCT/US2011/059139, dated Jan. 31, 2012, 12 pages.
Griswold, et al., "ActiveCamus—Sustaining Educational Communities through Mobile Technology." UCSD CSE Technical Report #CS200-0714, 2002, 19 pages.
Hazas, M., et al., "Location-Aware Computing Comes of Age," IEEE, vol. 37, Feb. 2004, 3 pages.
Hellerandt, M., et al., "Estimating Position and Velocity of Mobile in a Cellular Radio Network," IEEE Transactions on Vehicular Technology, vol. 46, No. 1, Feb. 1997, 7 pages.
International Search Report and Written Opinion of the International Searching Authority for PCT/US2009/046504, mailed Oct. 7, 2009, 12 pages.
International Search Report and Written Opinion of the International Searching Authority, mailing date Aug. 18, 2009 for PCT/US09/047527, 10 pages.
International Search Report and Written Opinion of the International Searching Authority, the United States Patent and Trademark Office, for International Application No. PCT/US2010/050511, dated Dec. 30, 2010, 8 pages.
International Search Report and Written Opinion of the International Searching Authority, the United States Patent and Trademark Office, for International Application No. PCT/US2010/050742, dated Dec. 3, 2010, 9 pages.
International Search Report and Written Opinion of the International Searching Authority, the United States Patent and Trademark Office, for PCT/US2010/041282, mailing date of Aug. 30, 2010, 8 pages.
Kim, M., et al., "Risks of Using AP locations discovered through war driving," Lecture Notes in Computer Science, vol. 3968, 2006, 15 pages.
Kirsner, S., "One more way to find yourself," The Boston Globe, May 23, 2005, Retrieved from www.boston.com, 2 pages.
Krumm, J., et al., "LOCADIO: Interferring Motion and Location from Wi-Fi Signal Strengths," First Annual International Conference and Mobile and Ubiquitous Sytstems: Networking and Services, Aug. 2004, 10 pages.
LaMarca, A., et al., "Place Lab: Device Positioning Using Radio Beacons in the Wild," Intel Corporation, 2004, 20 pages.
Muthukrishnan, K., et al., "Towards Smart Surroundings: Enabling Techniques and Technologies for Localization," Lecture Notes in Computer Science, vol. 3479, May 2005, 11 pages.
Wikipedia, "Dilution of Precision (GPS)," May 2009, 3 pages, http://web.archive.org/web/20090516014557/http://en.wikipedia.org/wiki/Dilution_of pre . . . Jul. 28, 2011.
Extended European Search Report issued by the European Patent Office for European Application No. EP 11838809.9 mailed Feb. 20, 2014 (6 pgs.).
Cheng, et al., "Accuracy Characterization for Metropolitan-scale Wi-Fi Localization," MobiSys '05 Proceedings of the 3rd International Conference on Mobile Systems, Applications, and Services, pp. 233-245, 13 pages (Jan. 2005).
Juneja, et al., "Location Services Using Cellular Digital Packet Data," Hughes Software Systems, ICPWC'96, pp. 222-226 (1996).

METHOD OF AND SYSTEM FOR INCREASING THE RELIABILITY AND ACCURACY OF LOCATION ESTIMATION IN A HYBRID POSITIONING SYSTEM

CROSS-REFERENCE TO RELATED APPLICATION

The present application claims priority under 35 U.S.C. §119(e) to U.S. Provisional Application No. 61/409,643 filed Nov. 3, 2010, entitled "Method Of And System For Increasing The Reliability And Accuracy Of Location Estimation In A Hybrid Positioning System," incorporated herein by reference in its entirety.

BACKGROUND OF THE INVENTION

1. Field of the Invention

The invention generally relates to hybrid positioning and more specifically, describes new methods to assess the quality of a reported location from specific source of location to be used for hybrid positioning.

2. Description of the Related Art

In recent years the number of mobile computing devices has increased dramatically, creating the need for more advanced mobile and wireless services. Mobile email, walkie-talkie services, multi-player gaming and call-following are examples of how new applications are emerging for mobile devices. In addition, users are beginning to demand/seek applications that not only utilize their current location but also share that location information with others. Parents wish to keep track of their children, supervisors need to track the locations of the company's delivery vehicles, and a business traveler looks to find the nearest pharmacy to pick up a prescription. All of these examples require an individual to know his own current location or the location of someone else. To date, we all rely on asking for directions, calling someone to ask their whereabouts or having workers check-in from time to time to report their positions.

Location-based services are an emerging area of mobile applications that leverage the ability of new devices to calculate their current geographic positions and report them to a user or to a service. Examples of these services range from obtaining local weather, traffic updates and driving directions to child trackers, buddy finders and urban concierge services. These new location-sensitive devices rely on a variety of technologies that all use the same general concept. By measuring radio signals originating from known reference points, these devices can mathematically calculate the user's position relative to these reference points. Each of these approaches has its strengths and weaknesses depending upon the nature of the signals and measurements, and the positioning algorithms employed.

The Navstar Global Positioning System ("GPS") operated by the US Government leverages about two-dozen orbiting satellites in medium-earth orbits as reference points. A user equipped with a GPS receiver can estimate his three-dimensional position (latitude, longitude, and altitude) anywhere at any time within several meters of the true location as long as the receiver can see enough of the sky to have four or more satellites "in view." Cellular carriers have used signals originating from and received at cell towers to determine a user's or a mobile device's location. Assisted GPS ("AGPS") is another model that combines both GPS and cellular tower techniques to estimate the locations of mobile users who may be indoors and must cope with attenuation of GPS signals on account of sky blockage. In this model, the cellular network attempts to help a GPS receiver improve its signal reception by transmitting information about the satellite positions, their clock offsets, a precise estimate of the current time, and a rough location of the user based on the location of cell towers. No distinction is made in what follows between GPS and AGPS.

All positioning systems using satellites as reference points are referred to herein as Satellite-based Positioning System ("SPS"). While GPS is the only operational SPS at this writing, other systems are under development or in planning A Russian system called GLONASS and a European system called Galileo may become operational in the next few years. All such systems are referred to herein as SPS. GPS, GLONASS and Galileo are all based on the same basic idea of trilateration, i.e., estimating a position on the basis of measurements of ranges to the satellites whose positions are known. In each case, the satellites transmit the values of certain parameters which allow the receiver to compute the satellite position at a specific instant. The ranges to satellites from a receiver are measured in terms of the transit times of the signals. These range measurements can contain a common bias due to the lack of synchronization between the satellite and receiver (user device) clocks, and are referred to as pseudoranges. The lack of synchronization between the satellite clock and the receiver (user device) clock can result in a difference between the receiver clock and the satellite clock, which is referred to as internal SPS receiver clock bias or receiver clock bias, here. In order to estimate a three dimensional position there is a need for four satellites to estimate receiver clock bias along with three dimensional measurements. Additional measurements from each satellite correspond to pseudorange rates in the form of Doppler frequency. References below to raw SPS measurements are intended generally to mean pseudoranges and Doppler frequency measurements. References to SPS data are intended generally to mean data broadcast by the satellites. References to an SPS equation are intended to mean a mathematical equation relating the measurements and data from a satellite to the position and velocity of an SPS receiver.

WLAN-based positioning is a technology which uses WLAN access points to determine the location of mobile users. Metro-wide WLAN-based positioning systems have been explored by several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. One example of a commercial metropolitan WLAN-based positioning system in the market at the time of this writing, is referred to herein as a WiFi Positioning System ("WPS") and is a product of Skyhook Wireless, Inc.

SUMMARY

Under one aspect of the invention, a method includes determining initial position estimates of a device using a satellite positioning system and also non-satellite positioning systems. The method, then, collects relevant information regarding each source of location and assigns weights for each source of location.

Under another aspect of the invention, a method for determining the position of a device in a hybrid positioning system is provided. The method comprises analyzing signals from at least two of a satellite positioning system ("SPS"), a Wi-Fi positioning system, and a cell positioning system ("CPS"), determining for each of the at least two of the SPS, Wi-Fi positioning system, and CPS, a corresponding initial position estimate of the device and at least one corresponding parameter, and selecting one of the corresponding initial position estimates as a final position estimate of the device based on at least one of a history of previously reported positions, the at least one corresponding SPS parameter, the at least one corresponding Wi-Fi positioning system parameter, and the at least one corresponding CPS parameter.

Under aspects of the invention, signals from a satellite positioning system, a Wi-Fi positioning system, and a cell positioning system are analyzed by the device. For each positioning system the device determines a corresponding initial position estimate and corresponding parameters and selects one of the corresponding initial position estimates as the final position of the device based the history of previously positions or the corresponding parameters.

DETAILED DESCRIPTION

Embodiments of a hybrid positioning system are disclosed herein. A hybrid positioning system refers to a positioning system for device location, which itself consists of more than one individual positioning system (or "source of location"). The hybrid positioning system can be defined as a system using final positions of different sources of locations as initial positions. The hybrid positioning system can selects or combine the initial locations and generates a position estimate based on observations by more than one source of location. The hybrid system combines observations from several separate positioning systems and provides one position estimate of the device. Each individual positioning system is able to detect a set of signal information from each of the system's signal sources, herein called "observables". Based on the possible observables of each reported location from different sources of location (i.e., different individual systems), the hybrid positioning system selects a source of location or a combination of different sources of locations and reports its final location to the user. In order to do so, embodiments of the invention use different observables at the receiver side to assess the quality of different sources of locations. This disclosure discusses methods to be used to select the best location. It also discusses methods to select the best location while reducing power consumption of a device. This can be achieved, for example, by changing the scanning rate of the device. Embodiments of the invention achieve better accuracy, better availability, faster time to fix (which includes time to first fix), and less power consumption for a device relative to known methods.

As mentioned above, implementations of the hybrid positioning system include more than one positioning system or generates position estimates based on more than one source of location. The individual positioning systems can use a method particular to that system to estimate a position of a device. In some implementations, a hybrid positioning system includes, or receives information from, at least two of the following three positioning systems: (1) a satellite positioning system, which uses signals transmitted by satellites to locate the device, (2) a WiFi positioning system, which uses signals transmitted by WiFi access points to locate the device, and/or (3) a cell positioning system, which uses signals transmitted by cell towers to locate the device.

Figure 1:
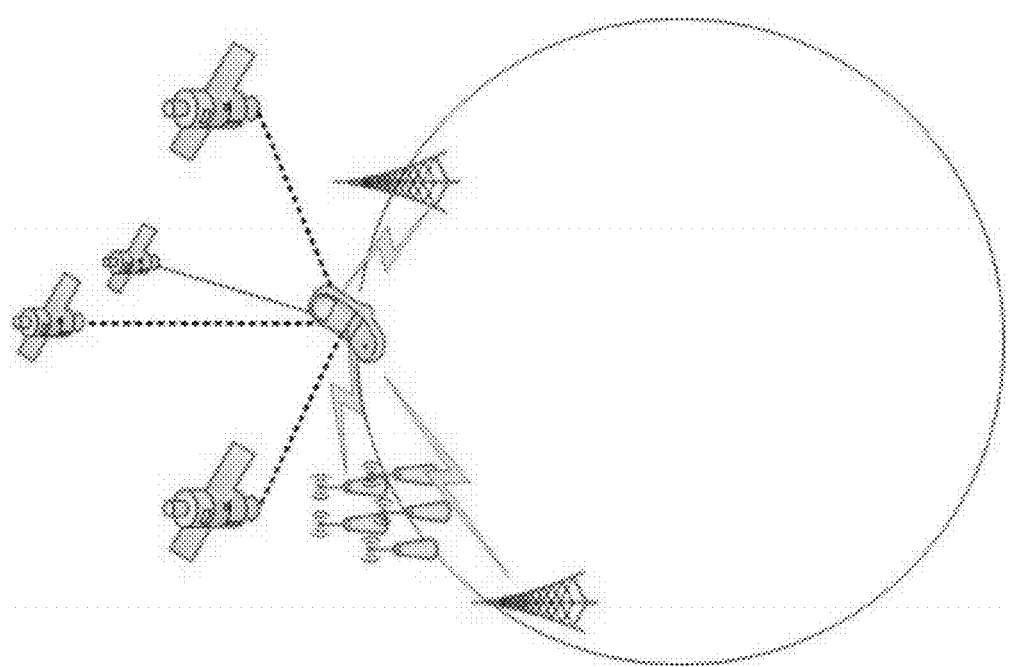
FIG. 1 illustrates a mobile device receiving signals from SPS satellites, WPS beacons, and CPS towers.

FIG. 1 illustrates a scenario in which a mobile device receives signals from SPS satellites, WPS beacons, and CPS towers. The individual positioning systems within an embodiment of the hybrid positioning system are used in the hybrid decision-making when they satisfy certain performance criteria enforced by the hybrid positioning system. The hybrid positioning system can enforce the individual positioning systems criteria to require accuracy better than a given threshold value in order to consider positioning estimates from the individual positioning systems in the switching algorithm. For example, the hybrid positioning system may decide to only use satellite locations when the number of satellites in view exceeding a certain threshold and reject otherwise.

Embodiments of the invention enable a hybrid positioning system to select a reported location from a specific positioning system. The hybrid positioning system analyzes different observable parameters obtained by individual positioning systems and selects one of the estimated positions provided by the individual positioning systems. The hybrid positioning system also analyzes different observable parameters by individual positioning systems to make a decision regarding enabling or disabling one or more available positioning systems and/or disabling corresponding devices in order to reduce the overall system power consumption. The hybrid positioning system then decides on which positioning system to use and how to report the final location of the device. One goal of certain implementations of the invention is to increase performance of a hybrid positioning system. Better performance can mean better accuracy, better availability, faster time to fix, or better power consumption. Performance can also be referred to as a combination of two or more of the accuracy, availability, accuracy, time to fix, power consumption as well.

In one embodiment, the outcome of each source of location in certain circumstances is combined and the calculated location is reported to the user. Under certain implementations, the quality of reported location for each source of location in hybrid positioning system is evaluated. The quality of each source of location and its reported location is evaluated by analyzing the observable parameters at the receiver. In certain circumstances, a high quality source of location is the one that shows strong signals and good positioning accuracy. On the other hand, a bad quality source of location is the one that shows weak signals and poor positioning accuracy. It should be noted that for each source of location, the parameters to indicate the quality of positioning accuracy is different from other sources of location.

Figure 2:
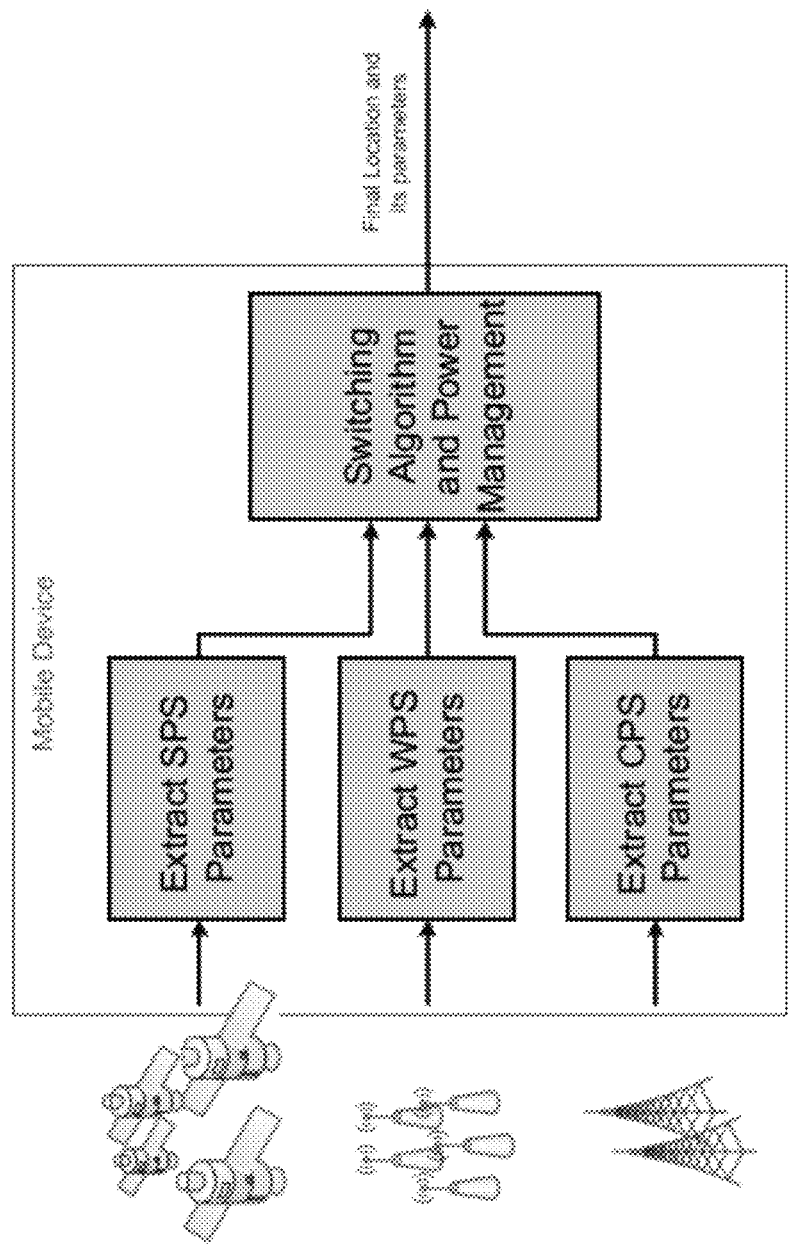
FIG. 2 illustrates a process for collecting relevant parameters of each location system (SPS, WPS, and CPS) and use of an algorithm implemented in a mobile device for switching.

As mentioned above, a hybrid positioning system can include two or more of an SPS, WPS, and/or CPS. Each of these sources of locations might provide user locations independent of other sources of locations. For example, at one instance of time, the hybrid positioning system might have access to locations obtained from all three sources, i.e. SPS, WPS, and CPS. The hybrid positioning system can then analyze each source of location for the accuracy of its reported location. After assessing the quality of each source of location, the hybrid positioning system can select the best and most accurate location and report that to user as final location estimate. FIG. 2 illustrates the process of collecting relevant parameters of each location system (SPS, WPS, and CPS) and sending the parameters to an algorithm implemented in a mobile device.

In the above mentioned process, either source of reported location or the hybrid positioning system are enabled to cache the previous reported location for some interval of time. For example, a hybrid system might report a cached SPS location for 10 seconds before reporting no location or before switching to WPS location. If hybrid system decides that WPS location accuracy is much worse than SPS location, it can report the old SPS location for an extended interval of time, then start reporting WPS location.

Generally, the accuracy of the reported location deteriorates from SPS to WPS to CPS. One technique for the selection of sources of location estimates based on availability of better-known sources of location is known by those having ordinary skill in the art as a waterfall switching algorithm. Embodiments of the invention select between different sources of location estimates and report the best location according to a performance criterion rather than a predetermined preference. Thus, for example, a decision can be made to select and/or report position location estimate from a WPS even thought an estimate from an SPS location is available when the hybrid positioning system determined that the quality of the position estimate from the SPS is lower than that of the WPS.

Herein, are disclosed for each source of location (i.e., individual positioning system) parameters that are relevant to a switching algorithm that allows the hybrid positioning system to evaluate the quality of the reported location. The first source of location discussed herein is SPS, which relies on receiving satellite and measurement information from satellites at the receiver side. When started, an SPS listens for satellite signals, receives, and processes them. The received signals, along with some other information passed to the SPS (e.g., via a network) could enable the receiver to calculate its location. The principle used here is to know the exact location of the satellite and measure the distance of the satellite to the receiver. The receiver then solves a set of equations and calculates the location of the receiver. The quality of the reported location in SPS is usually assessed through Horizontal Dilution of Precision (HDOP.) The smaller the HDOP value, the better the positioning accuracy. Examples of SPS are GPS (Global Positioning System), Galileo, GLONASS, or Compass.

In one implementation, the elapsed time to obtain the fix (which is called time to fix or TTF) is used as an indicator of the quality of an estimated location. Specifically, in open environments and areas with good visibility to SPS satellites, fix comes quickly. On the other hand, in challenging environments for SPS devices, e.g., in a location with a limited view of the sky, fix might take some time to arrive. The hybrid position system can take advantage of this difference in TTF and assign a quality factor to SPS location. In addition, elapsed time after fix (TAF) can also be used as an indicator of the quality of an SPS estimated location. Time after fix (TAF) refers to the duration of time that a fix has been continuously provided without a gap in time. In general, in open environments and areas with good visibility to SPS satellites, an SPS device can maintain its fix. However, in challenging environments for SPS devices, the device might not be able to maintain the fix. This results in small TAF values and indicates that device is in challenging environment for SPS.

Furthermore, implementations of the invention combine the above metrics and use the result as an indicator of the quality of an SPS estimated location. The combination of TTF and TAF can be considered as another metric. The proposed metric looks for "gaps" in time for consecutive fixes. So if SPS fixes are obtained and lost frequently, system decides that the SPS device is in challenging environment for SPS. For example, if SPS fix is lost for 5 seconds and a fix is provided after five seconds, then TTF for the new fix is 5 s. If we get subsequent fixes for the next 120 s, then TAF is 120 s. The combination of TTF and TAF, 5 s to get the fix and continuous fixes for 120 s, would indicated that there is no gap in acquiring SPS fixes and the quality of SPS location is likely to be very good.

Secondary measures are also employed to estimate the quality of an SPS location estimate, as follows. The hybrid positioning system can use number of satellites used to calculate the SPS location as an indicator of type of environment. In open environments, the number of satellites used in a fix is generally large. On the other hand, in challenging environments for SPS, fixes are obtained with very few satellites, and fixes are maintained with few satellites. Also, the velocity of the device as determined by SPS can be used as a secondary measure of quality. In general, when the SPS velocity is relatively large, the SPS receiver is considered to be located in an open sky environment and its location is considered to be very accurate. For example, having SPS locations with reported velocity of 60 mph would indicate that the device is in driving mode and hence likely to be outdoors and not indoors. This would indicate that the quality of SPS-provided location is good. Finally, the number of satellites currently in view can be used as an indicator of the type of environment. In open sky environments, generally, an SPS can receive signals from different satellites, and the number of satellites in view is large. On the other hand, in challenging environments for SPS, the number of satellites in view is low. Note that number of satellites in view refers to number of satellites from which the SPS receiver receives signal. The velocity in this discussion can come from SPS or other sources of location such as Wi-Fi positioning system. It can also come from other sensors on the device or working with the device. For example, the velocity can come from speedometer of a car which is connected to the device. Same discussion applies to bearing.

There also exist another measure to estimate the quality of the provided SPS location. The hybrid positioning system can use the variations in positions provided by SPS in specified time interval to measure the quality of SPS location. For example, variations measures such as variance, standard deviation, range, interquartile range, etc. might be used to gauge the variation of SPS position for 30 seconds of reporting location. In addition, the hybrid positioning system can use variations of other parameters related to SPS position in order to assess the quality of SPS reported location. The changes should follow a logical order of changes for a device. For example, the hybrid positioning system can use variations in velocity, bearing, and number of satellites used to derive the SPS location which all are reported by SPS. In such cases, huge jumps and variations in velocity or bearing of the device would indicate that SPS-provided locations might be of lower quality and/or the environment has changed.

The hybrid positioning system can also use the variation of combination of all the above parameters in order to assess the quality of the SPS location. In open and non-challenging environments to SPS, usually SPS provided location moves slowly from one point to the other point. In mobile devices that are within such environments, these changes can also be correlated with velocity of the vehicle and the integrity of the provided solution can be checked. The displacements in subsequent locations are according to the signals received from satellites and they follow the physical rules governing the device. For example, for a device moving with 10 m/s velocity, the location of the device from one point in time to a second after that time should only change 10 m. Changes much larger than 10 m would indicate that either the location or the velocity reported by SPS and other positioning systems were not correct and should raise a flag for the hybrid positioning system. For such quality checks, the hybrid positioning system, based on realistic values for velocity and bearing and previous SPS location, can reject a new reported SPS location, if the new location is much further than anticipated location. This can provide integrity on the reported location and avoid large jumps in location which are not feasible.

For another example, in open environments, the SPS location rarely has huge jumps in velocity and bearing as they should continuously change. Also, the number of satellites used to derive SPS location does not exhibit large jumps. This results in small variations in velocity, bearing, and number of satellites. On the other hand, in challenging environments, we frequently observe jumps in number of satellites reported by SPS. Velocity and bearing also show large variations. These changes are also not in line with change of velocity of the device. Therefore, the variations in the reported positions by SPS are significantly higher compared to open sky environments. Another specific variation can be defined as the jumps in reported location. This "jumpiness" behavior is usually not observed in open sky and non-challenging environment to SPS. On the other hand, in challenging environment for SPS, the location might frequently and unusually jump from a place to another place.

The next source of location examined here is a WiFi positioning system (WPS). WiFi positioning generally relies on received signals from different WiFi beacon devices. After receiving the signals from a wireless beacon or WiFi access point (AP) device, it might calculate the received power for all visible devices. WiFi Positioning then compares this information against a database of known AP devices and decides on the location of the user. WiFi Positioning is generally less accurate than SPS, but it has been shown that in challenging environments for SPS, WiFi Positioning can be more accurate. Such challenging environments might include urban canyons (a canyon-like effect created by surrounding buildings) and indoor environments. This disclosure discusses the possibility of detecting such cases and the type of environment. Based on such a conclusion, the hybrid positioning system selects the best possible location when both SPS and WiFi positioning are available.

In one implementation, the number of observed wireless beacons (i.e. wireless access points) can be used as an indicator of type of environment. In general, a large number of wireless devices can indicate a challenging environment for SPS, such as indoors or in a dense urban environment. If an environment is challenging for SPS, it might take longer to acquire a fix, and the accuracy of the fix might be lower. This might indicate that although both WiFi Positioning and SPS locations are available, the WiFi Positioning location might be more accurate. For example, in dense urban environments, the number of observed wireless devices typically follows a distribution where its mean is much larger than distribution of number of APs in open sky environments. This observation could indicate that the device is located in a dense urban environment, and its SPS location might not be as accurate as a WPS location, or SPS takes longer than normal to acquire a fix.

In addition, the quality of the location estimate returned from a WPS can be used as an indicator of the quality of WiFi Positioning location relative to other individual systems. The relative quality of reported locations from a WPS and an SPS enables the hybrid system to make a better decision in reporting the final location. For example, a very good location obtained from WiFi Positioning could be more accurate than a location obtained from SPS with few satellites and poor quality of location.

Some implementations can use the maximum observed power from observed wireless devices as an indicator of the type of the environment that the device is working and relate it to the relative quality of SPS and the quality of WiFi Positioning location. Generally, when a wireless device is observed with high power, it could indicate that the receiver is located in indoor environments. Hence, it could be difficult to obtain a high quality SPS location, which translates to higher time to fix and lower accuracy. This could indicate that any SPS provided location does not represent the true location and suffers from large inaccuracies in the provided location.

Further still, the distance between an SPS-provided location and a WiFi Positioning-provided location can be used as a metric to select between two reported locations. Generally, when the two locations are very far from one another, it is assumed that the SPS location is more accurate due to the nature of SPS. Hence, the hybrid positioning system should report the SPS location as its final location.

In further embodiments of the invention, an aggregate of different parameters, namely, number of satellites used in a fix, number of parameters in view, horizontal dilution of precision "HDOP," quality value of positioning in WiFi Positioning, inferred type of the environment the device is working in, number of WLAN devices used in WiFi Positioning, association information to an WLAN device, etc. are used to select the most accurate source of location. The aggregate parameters can indicate the type of environment in which the receiver resides. Thus, the system can use the aggregate information to select the best source among several location estimates.

Also disclosed herein are techniques to use the aforementioned information to reduce the power consumption of a mobile device, and, thereby, increase battery life. In certain implementations, several parameters, namely, the number of WLAN devices used in WiFi Positioning and the maximum power observed from WLAN devices, are used to infer that the mobile device is in a challenging environment for SPS. Thus, an SPS present in the mobile device is instructed to remain off or the powering-on of the SPS is delayed. Furthermore, the SPS can be powered-down if it does not acquire a fix within a designated period of time.

Such a technique can be employed when the mobile device starts a search for location. In traditional methods, the mobile device turns all devices on to find a location and presents the location result according to the waterfall switching algorithm. The techniques disclosed herein propose to use the above parameters to delay turning-on the SPS hardware, or avoid powering-on the SPS all together in certain situations, in order to reduce power consumption by the mobile device. Moreover, if powered on, the SPS hardware would be turned off if they do not acquire a fix within a predetermined period of time.

Similarly, other device and network information can be used to power-up or power-down portions of hardware or separate devices. Implementations of the invention propose to use association information between a WLAN AP and a mobile device, or any communication between a WiFi enabled device and a WLAN AP, as an indication of a high likelihood that the mobile device is indoor and/or is stationary. Such a determination can be used to delay powering-on SPS hardware in situations where it could not be completely confirmed that the device is indoors and/or is stationary. In the alternative, the SPS hardware can be left off or turned off if no location is acquired.

Further still, the techniques disclosed herein can be used to power-off SPS hardware within a mobile device when indications are detected that the mobile device is indoors or in a challenging environment for SPS. Similarly, the determination that the mobile device is indoors can be combined with the detection that the mobile device is not moving (or moving very slowly) to result in powering-off the SPS hardware. Therefore, when WPS hardware in the mobile device detects a low velocity, or that the user is stationary, the mobile device can power-off the SPS hardware to reduce power consumption. On the other hand, when the WPS hardware detects a moderate or higher velocity, the SPS hardware can be kept on.

The techniques disclosed herein also enable different methods to reduce the power consumption of mobile devices by dynamically changing the scan rate of the WiFi positioning system. In certain operating scenarios, increased scan rates do not improve the accuracy of position estimates of the system and only consume more power. Thus, some implementations determine if a scanning strategy is not optimized and adjust the scanning rate of the positioning engine to optimize the power consumption. In addition, some embodiments optimize the trade-off between positioning accuracy and power. Parameters such as association to a WLAN device, velocity of the mobile unit estimated from different sources of location, number of WLAN devices used in WiFi Positioning, maximum power observed from any WLAN device in range, and number of satellites in view can be used to change the scanning rate of the positioning algorithm.

Other parameters can also be used to optimize the scanning rate. Scanning rate is defined as the rate of scanning the surrounding environment and searching for related signals for each positioning system. Scanning rate is applicable to Wi-Fi Positioning Systems and CPS. SPS typical continuously search for signals from satellites and updates location estimate every second. However, Wi-Fi Positioning Systems can have different scanning rates, therefore the rate of turning on the wireless device and scanning the environment for near by wireless APs can be different from SPS. The scanning rate of the Wi-Fi Positioning System or CPS can be adjusted dynamically when the positioning algorithm switches from initial location state (one-shot location—for applications without a need to track the device) to tracking state (in which location is updated periodically). For example, in such scenarios, the scanning rate for initial location state is lowered for power saving, while in tracking mode, because the user is concerned about receiving the best possible location, the scanning rate is increased to improve the accuracy. In another implementation, the time during which a location request is active is used to optimize the scanning rate. For example, if a particular application calls for a location request at a known frequency (e.g., every 10 seconds), then the scanning rate of the positioning algorithm can be adjusted to scan and/or power-on particular location system only when a location estimate must be provided.

In certain implementations, the techniques for reducing power consumption to increase battery life are disabled when the mobile device detects that it is connected to an external power source.

Figure 3:
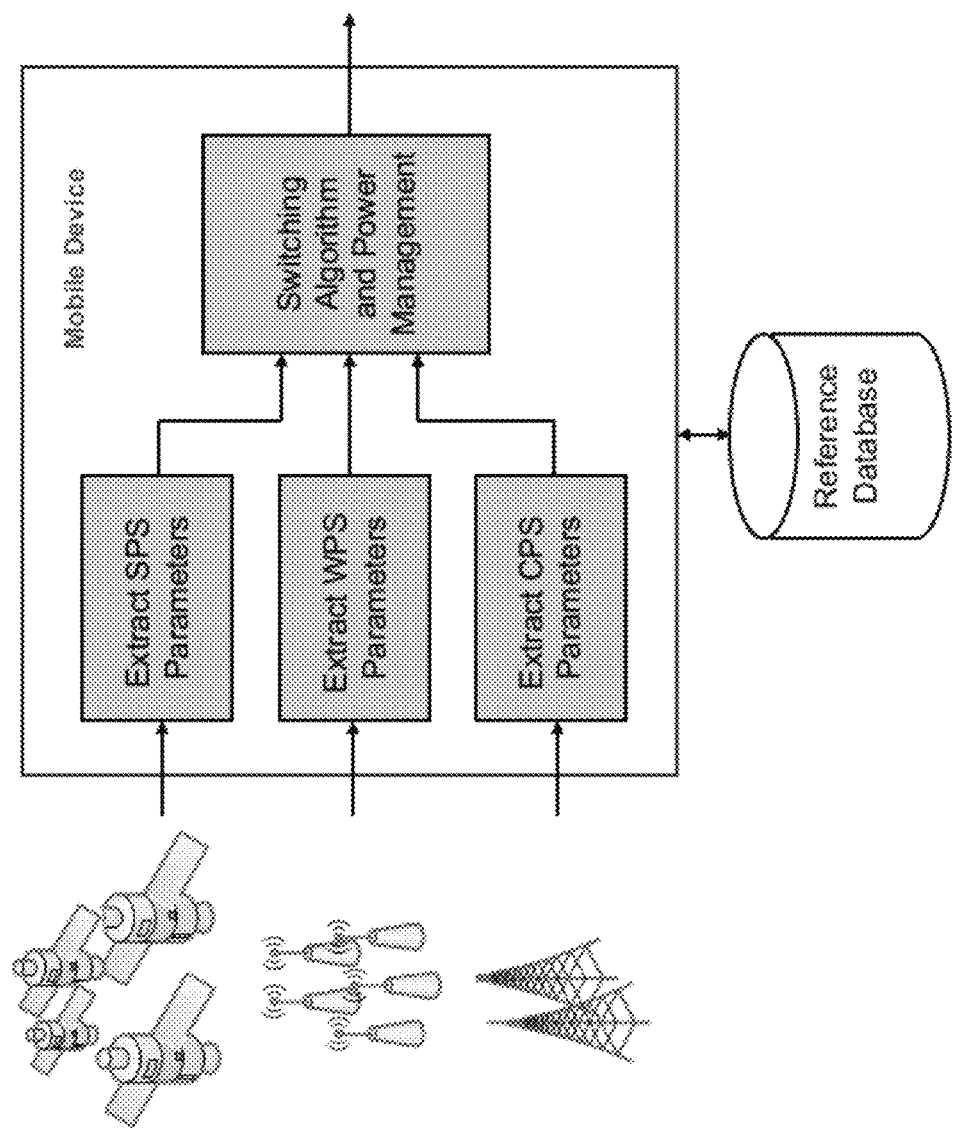
FIG. 3 illustrates a process for collecting relevant parameters of each location system (SPS, WPS, and CPS) and use of an algorithm implemented in a mobile device for switching and a reference database.

According to alternative embodiments, FIG. 3 illustrates the process of collecting relevant parameters of each location system (SPS, WPS, and CPS), using a reference database that may perform the initial position determination, and sending different parameters and the initial positions returned from the database to an algorithm implemented in a mobile device.

Figure 4:
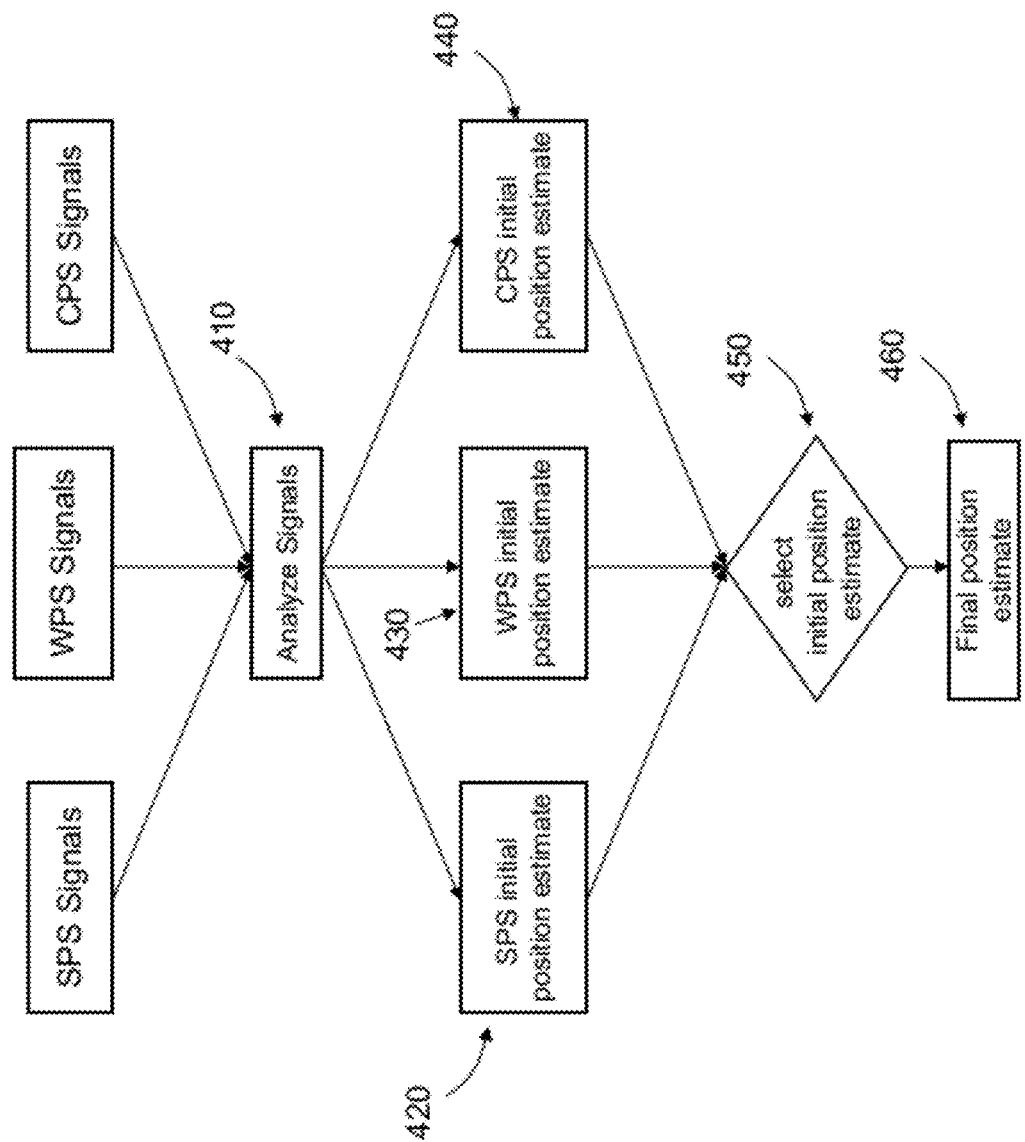
FIG. 4 illustrates a method of location estimation according to aspects of the present invention.

FIG. 4 illustrates a flow chart of a method for position estimation of a mobile device according to aspects of the present disclosure. Signals from at least two positioning systems are analyzed in step 410. In the example illustrated in FIG. 4, signals from a satellite positioning system ("SPS"), a Wi-Fi positioning system, and a cell positioning system ("CPS") are analyzed. The method determines a corresponding initial position estimate for the SPS (420), for the Wi-Fi positioning system (430), and/or for the CPS (440), based on the analyzed signals. The method in step 450 selects an initial position estimate as the final position estimate 460.

Figure 5:
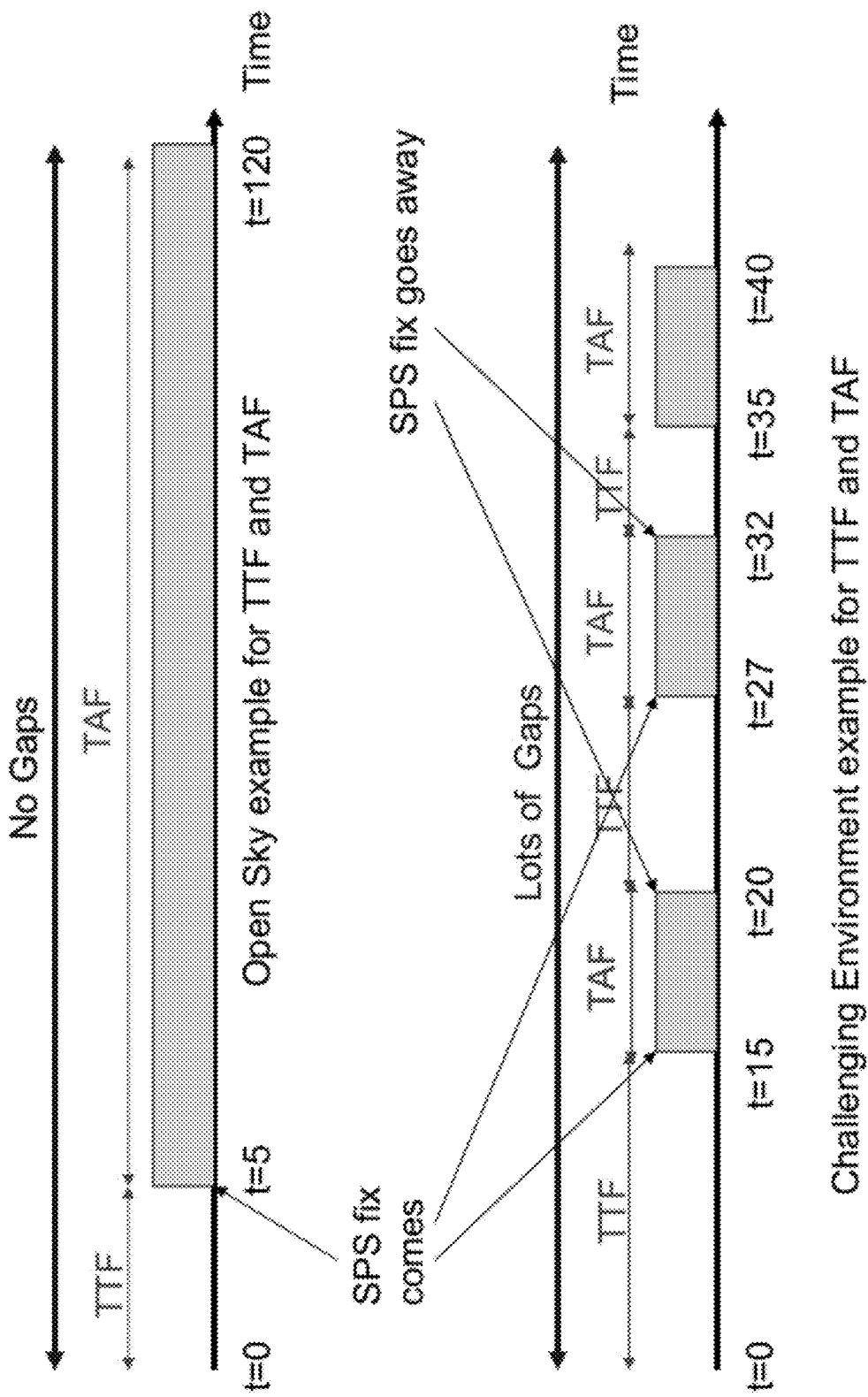
FIG. 5 illustrates a method of determining the type of environment and the quality of the location estimate for a satellite position system.

FIG. 5 illustrates a method for determining the type of environment using SPS parameters. When the device is in an open sky environment, there are no gaps between SPS fixes. For example, as seen at the top part of the figure, the TTF is between t=0 and t=5, and then the TAF is between t=5 and t=120. At the bottom part of the figure, there is an example of a challenging environment where there are a lot of instances where there is a fix and shortly after the fix is lost.

EXAMPLE 1

The following discussion is one example of a method for switching between different sources of locations (individual positioning systems). In this example, the hybrid positioning system is assumed to have access to both an SPS and a WPS. During certain periods of time, each source of location is capable of providing a location estimate. However, at times, due to blockage of signals, for example, one or both systems are unable to provide a location estimate.

In such an operating scenario, the hybrid positioning system assesses the quality of the location estimates from each source of location. If location estimates from the SPS and the WPS are both available, the hybrid positioning system evaluates the accuracy of the location estimate provided by the SPS. For example, this can include analyzing the SPS parameters described above. If the quality of the location estimate provided by the SPS is high, the hybrid positioning system reports the SPS location immediately and does not evaluate the quality of the location estimate of the WPS. Otherwise, if the quality of the location estimate from the SPS is low, the hybrid positioning system analyzes the parameters of the WPS and compares the quality determinations. If the WPS accuracy is above a given threshold while the accuracy of the SPS location estimate has fallen below a certain threshold, the hybrid positioning system reports the location provided by the WPS. In cases where the position estimates from both the SPS and the WPS, the hybrid positioning system reports the SPS provided location. Finally, if only one source of location is able to provide an estimated location, then the hybrid positioning system reports the location from the only available system.

EXAMPLE 2

In another illustrative implementation, a neural network can be used to select between the sources of location. This approach can be generalized when more sources are available. In the training phase of this approach, the hybrid positioning system is trained with a comprehensive set of data. Each data set includes an SPS location estimate and its associated parameters, a WPS location estimate and its associated parameters, a CPS location estimate and its associated parameters, and the best final decision that could be made for that case. In the training phase, the best final decision can be based on the known locations of the device when the training data set is assembled. The parameters associated with SPS and WPS sources of location are those described above. Parameters associated with CPS as a source of location include number of towers used for positioning, the relative power of the signals from the towers, the statistics of the signal power (e.g., variability, type of noise, etc.), and an error estimation associated with the towers, if available. After training the neural network with this dataset until it converges, the neural network determines a set of coefficients to be arithmetically added or multiplied to the inputs of the neural network. These coefficients can then be used in a receiver program to select between all possible options.

Another technique for deciding which source(s) of location to use in a particular situation includes considering the history of previous location estimates. For example, assuming that both WPS and SPS estimates are available at the present moment and both have been available for a certain period of time, the hybrid positioning system can elect to use the SPS locations estimate as the present location. This is so because long-acquired SPS location estimates are believed to have more accurate locations than recent obtained location estimates. In other words, the time after obtaining a first location estimate in a current run of a hybrid positioning system can directly affect the decision as to which source of location is the most reliable and/or accurate. If a receiver is able to track SPS location estimates for more than several minutes, the location accuracy of that source is deemed to increase as time passes.

As discussed in more detail above, there are several implementations of the techniques disclosed herein for determining the most reliable and/or most accurate source of location in a particular situation. In some embodiments of the invention, the hybrid positioning system can use different algorithms to select between different sources of location depending on how long the hybrid positioning system has been operational after initialization. For example, upon initialization and for a predetermined time thereafter, the system can employ the switching technique set forth above in Example 1, and at operational times greater than the predetermined time employ the switching technique set forth above in Example 2.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems and under different platforms.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, satellite positioning units (e.g., GPS devices), and/or mobile computing devices capable of receiving the signals discussed herein can be used in implementations of the invention. The location estimate, expected error of the position estimate, and/or the probability values can be displayed on the mobile device and/or transmitted to other devices and/or computer systems. Further, it will be appreciated that the scope of the present invention is not limited to the above-described embodiments, but rather is defined by the appended claims; and that these claims will encompass modifications of and improvements to what has been described.

What is claimed is:

1. A method for determining a position of a device using signals from multiple positioning systems, the method comprising:
   analyzing signals from at least two of a satellite positioning system ("SPS"), a Wi-Fi positioning system, and a cell positioning system ("CPS");
   determining for each of the at least two of the SPS, the Wi-Fi positioning system, and the CPS, a corresponding initial position estimate of the device and at least one corresponding parameter;
   assessing for each of the corresponding initial position estimates a quality of the initial position estimate; and
   selecting one of the corresponding initial position estimates as a final position estimate of the device based on the assessed qualities of the initial position estimates:
   wherein an elapsed time after a fix (TAF) is used as an indicator of the quality of the initial position estimate of the SPS.

2. The method according to claim 1, wherein each initial position estimate is determined solely from the signals of the corresponding positioning system.

3. A method for determining a position of a device using signals from multiple positioning systems, the method comprising:
   analyzing signals from at least two of a satellite positioning system ("SPS"), a Wi-Fi positioning system, and a cell positioning system ("CPS");
   determining for each of the at least two of the SPS, the Wi-Fi positioning system, and the CPS, a corresponding initial position estimate of the device and corresponding parameters;
   assessing for each of the corresponding initial position estimates a quality of the initial position estimate; and
   selecting one of the corresponding initial position estimates as a final position estimate of the device based on the assessed qualities of the initial position estimates; and switching to another one of the corresponding initial position estimates as a second final position estimate of the device based on at least one of the history of the previously reported positions, the at least one corresponding SPS parameter, the at least one corresponding Wi-Fi positioning system parameter, and at least one corresponding CPS parameter;
wherein a combination of an elapsed time to obtain a fix (TTF) and a TAF is used as an indicator of the quality of the initial position estimate of the SPS.

4. The method according to claim 3, wherein the SPS initial position is cached for a period of time.

5. A method for determining a position of a device using signals from multiple positioning systems, the method comprising:
analyzing signals from at least two of a satellite positioning system ("SPS"), a Wi-Fi positioning system, and a cell positioning system ("CPS");
determining for each of the at least two of the SPS, the Wi-Fi positioning system, and the CPS, a corresponding initial position estimate of the device and corresponding parameters;
assessing for each of the corresponding initial position estimates a quality of the initial position estimate; and
selecting one of the corresponding initial position estimates as a final position estimate of the device based on the assessed qualities of the initial position estimates:
wherein an elapsed time to obtain a fix (TTF) is used as an indicator of the quality of the initial position estimate of the SPS.

6. The method according to claim 5, further comprising switching to another one of the corresponding initial position estimates as a second final position estimate of the device based on an indicator of a type of environment; wherein the indicator of the type of environment is based on the TTF.

7. The method according to claim 5, wherein an elapsed time after a fix (TAF) is used as an indicator of the quality of the initial position estimate of the SPS.

8. The method according to claim 7, further comprising switching to another one of the corresponding initial position estimates as a second final position estimate of the device based on an indicator of a type of environment; wherein the indicator of the type of environment is based on the TAF.

9. The method according to claim 5, wherein a combination of a TTF and a TAF is used as an indicator of the quality of the initial position estimate of the SPS.

10. The method according to claim 9, further comprising switching to another one of the corresponding initial position estimates as a second final position estimate of the device based on an indicator of a type of environment; wherein the indicator of the type of environment is based on the combination of a TTF and a TAF.

11. The method according to claim 5, wherein a number of satellites in fix or in view is used as an indicator of the quality of the initial position estimate of the SPS.

12. The method according to claim 11, further comprising switching to another one of the corresponding initial position estimates as a second final position estimate of the device based on an indicator of a type of environment; wherein the indicator of the type of environment is based on the number of satellites in fix or in view.

13. The method according to claim 5, wherein a velocity of the device is used as an indicator of the quality of the initial position estimate of the SPS.

14. The method according to claim 13, further comprising switching to another one of the corresponding initial position estimates as a second final position estimate of the device based on an indicator of a type of environment; wherein the indicator of the type of environment is based on the velocity of the device.

15. The method according to claim 5, wherein an indicator of the quality of the initial position estimate of the SPS is based on a combination of at least two of a TTF, a TAF, a number of satellites in fix or in view, and a velocity of the device.

16. The method according to claim 15, further comprising switching to another one of the corresponding initial position estimates as a second final position estimate of the device based on an indicator of a type of environment; wherein the indicator of the type of environment is based on the combination of at least two of the TTF, the TAF, the number of satellites in fix or in view, and the velocity of the device.

17. The method according to claim 5, wherein an indicator of the quality of the initial position estimate of the SPS is based on variations in position estimates provided by the SPS.

18. The method according to claim 17, further comprising switching to another one of the corresponding initial position estimates as a second final position estimate of the device based on an indicator of a type of environment; wherein the indicator of the type of environment is based on the variations in position estimates provided by the SPS.

19. The method according to claim 5, wherein an indicator of the quality of the initial position estimate of the SPS is based on variations in velocity of the device.

20. The method according to claim 19, further comprising switching to another one of the corresponding initial position estimates as a second final position estimate of the device based on an indicator of a type of environment; wherein the indicator of the type of environment is based on the variations in velocity of the device.

21. The method according to claim 5, wherein an indicator of the quality of the initial position estimate of the SPS is based on variations in bearing.

22. The method according to claim 21, further comprising switching to another one of the corresponding initial position estimates as a second final position estimate of the device based on an indicator of a type of environment; wherein the indicator of the type of environment is based on the variations in bearing.

23. The method according to claim 5, wherein an indicator of the quality of the initial position estimate of the SPS is based on jumpiness of reported positions by the SPS.

24. The method according to claim 23, further comprising switching to another one of the corresponding initial position estimates as a second final position estimate of the device based on an indicator of a type of environment; wherein the indicator of the type of environment is based on the jumpiness of reported positions by the SPS.

25. The method according to claim 5, wherein an indicator of the quality of the initial position estimate of the Wi-Fi positioning system is based on a number of Wi-Fi access points in range of the device.

26. The method according to claim 25, further comprising switching to another one of the corresponding initial position estimates as a second final position estimate of the device based on an indicator of a type of environment; wherein the indicator of the type of environment is based on the number of Wi-Fi access points in range of the device.

27. The method according to claim 5, wherein an indicator of the quality of the initial position estimate of the Wi-Fi positioning system is based on a maximum observed power from Wi-Fi access points in range of the device.

28. The method according to claim 27, further comprising switching to another one of the corresponding initial position estimates as a second final position estimate of the device based on an indicator of a type of environment; wherein the indicator of the type of environment is based on the maximum observed power from Wi-Fi access points in range of the device.

29. The method according to claim 1, wherein selecting one of the corresponding initial position estimates of the device as a final position estimate of the device is according to the distance between the SPS-provided initial position estimate and the Wi-Fi positioning system initial position estimate.

30. The method according to claim 1, wherein selecting one of the corresponding initial position estimates of the device as a final position estimate of the device is according to at least one of a number of satellites used in a fix, a horizontal dilution of precision, a number of Wi-Fi access points used in Wi-Fi positioning, association information to a Wi-Fi access point, and history of previous location estimates.

31. The method according to claim 5, wherein an indicator of the quality of the initial position estimate of the SPS is based on SPS parameters including at least one of a TTF, a TAF, a number of satellites in fix or in view, a velocity of the vehicle, a HDOP, variations of the TTF, variations of the TAF, variations of the number of satellites in fix or in view, variations of the velocity of the vehicle, and variations of the HDOP.

32. The method according to claim 31, further comprising turning on or off logic in the device that determines initial position estimates based on an indicator of a type of environment;
changing the scanning rate of the Wi-Fi positioning system and/or the CPS based on an indicator of a type of environment;
wherein the indicator of the type of environment is based on the SPS parameters.

33. The method according to claim 5, wherein an indicator of the quality of the initial position estimate of the Wi-Fi positioning system is based on Wi-Fi parameters including at least one of a number of access points in range of the device, a maximum power, statistics of power, quality of Wi-Fi positioning systems, variations of the number of access points in range of the device, variations of the maximum power, variations of the statistics of power, variations of the quality of the initial position estimate of the Wi-Fi positioning systems.

34. The method according to claim 33, further comprising turning on or off logic in the device that determines initial position estimates based on an indicator of a type of environment;
changing the scanning rate of the Wi-Fi positioning system and/or the CPS based on an indicator of a type of environment;
wherein the indicator of the type of environment is based on the Wi-Fi positioning system parameters.

35. The method according to claim 1, wherein a scanning rate of each of the at least two of a SPS, a Wi-Fi positioning system, and a CPS is individually optimized according to at least one of an association information to a Wi-Fi access point, a velocity of the device, a number of Wi-Fi access points used in Wi-Fi positioning, and a number of satellites used in view.

36. The method according to claim 1, further comprising changing the scanning rate for the Wi-Fi positioning system or the CPS if the device is in one-shot or tracking mode.

37. The method according to claim 1, further comprising turning on or off the device based on the device being in one-shot or tracking mode.

38. The method according to claim 1, further comprising changing the scanning rate for the Wi-Fi positioning system or the CPS if the device is connected to an external power supply.

39. The method according to claim 1, further comprising:
evaluating the quality of the corresponding initial position estimate of a first positioning system of the at least two of a SPS, a Wi-Fi positioning system, and a CPS; and
selecting the corresponding initial position estimate of the first positioning system as the final position estimate of the device without evaluating the quality of the initial position estimate of a second positioning system of the at least two of a SPS, a Wi-Fi positioning system, and a CPS.

40. A method for determining a position of a device using signals from multiple positioning systems, the method comprising:
analyzing signals from at least two of a satellite positioning system ("SPS"), a Wi-Fi positioning system, and a cell positioning system ("CPS");
determining for each of the at least two of a SPS, Wi-Fi positioning system, and CPS, a corresponding initial position estimate of the device based on the analyzed signals;
assessing for each of the corresponding initial position estimates a quality of the initial position estimate;
combining the corresponding initial position estimates to determine a combined initial position estimate; and
selecting either one of the corresponding initial position estimates of the device or the combined initial position estimate as a final position estimate of the device based on the assessed qualities of the initial position estimates;
wherein an elapsed time to obtain a fix (TTF) is used as an indicator of the quality of the initial position estimate of the SPS.

41. A non-transitory computer-readable storage device containing a set of instructions that causes a mobile device to:
analyze signals from at least two of a satellite positioning system ("SPS"), a Wi-Fi positioning system, and a cell positioning system ("CPS");
determine for each of the at least two of a SPS, Wi-Fi positioning system, and CPS, a corresponding initial position estimate of the device based on the analyzed signals; and
assess for each of the corresponding initial position estimates a quality of the initial position estimate;
select one of the corresponding initial position estimates of the device as a final position estimate of the device based on the assessed qualities of the initial position estimates;
wherein an elapsed time to obtain a fix (TTF) is used as an indicator of the quality of the initial position estimate of the SPS.

* * * * *

UNITED STATES PATENT AND TRADEMARK OFFICE
CERTIFICATE OF CORRECTION

PATENT NO. : 8,890,746 B2  
APPLICATION NO. : 13/288292  
DATED : November 18, 2014  
INVENTOR(S) : Farshid Alizadeh-Shabdiz et al.

It is certified that error appears in the above-identified patent and that said Letters Patent is hereby corrected as shown below:

In the Specification:  
Col. 5, line 29 should read:  
even though an estimate from an SPS location is available In the Claims:  
Claim 1, Col. 12, line 45 should read:  
the assessed qualities of the initial position estimates;

Claim 3, Col. 13, line 6 should read:  
positioning system parameter, and the at least one corre- Signed and Sealed this  
Tenth Day of May, 2016

Michelle K. Lee  
*Director of the United States Patent and Trademark Office*